(12) United States Patent
Park

(10) Patent No.: US 9,643,082 B2
(45) Date of Patent: May 9, 2017

(54) SYSTEM, METHOD AND COMPUTER READABLE RECORDING MEDIUM FOR SEARCHING GAME CHALLENGE OPPONENTS BASED ON ACTION OF USER

(71) Applicant: K-INNOVATION, Seongnam-si (KR)

(72) Inventor: So Youn Park, Seongnam-si (KR)

(73) Assignee: K-INNOVATION, Seongnam-si (KR)

( * ) Notice: Subject to any disclaimer, the term of this patent is extended or adjusted under 35 U.S.C. 154(b) by 924 days.

(21) Appl. No.: 13/723,999

(22) Filed: Dec. 21, 2012

(65) Prior Publication Data
US 2013/0165237 A1 Jun. 27, 2013

(30) Foreign Application Priority Data
Dec. 21, 2011 (KR) ........................ 10-2011-0139274

(51) Int. Cl.
| | | |
|---|---|---|
| *A63F 9/24* | (2006.01) | |
| *A63F 13/00* | (2014.01) | |
| *G06F 17/00* | (2006.01) | |
| *G06F 19/00* | (2011.01) | |
| *A63F 13/211* | (2014.01) | |
| *A63F 13/216* | (2014.01) | |
| *A63F 13/795* | (2014.01) | |

(Continued)

(52) U.S. Cl.
CPC .......... *A63F 13/211* (2014.09); *A63F 13/216* (2014.09); *A63F 13/332* (2014.09); *A63F 13/795* (2014.09); *A63F 13/92* (2014.09)

(58) Field of Classification Search
CPC .. A63F 13/12; A63F 13/235; A63F 2300/205; A63F 13/211; A63F 13/332; A63F 13/795; A63F 13/92; A63F 13/216

USPC ........................................................ 463/42
See application file for complete search history.

(56) References Cited

U.S. PATENT DOCUMENTS

2007/0197295 A1* 8/2007 DiBlasi ................... A63F 13/12
463/42
2009/0047982 A1* 2/2009 Shi et al. ...................... 455/466
(Continued)

FOREIGN PATENT DOCUMENTS

| JP | 2005-058537 | 3/2005 |
| JP | 2006-148448 | 6/2006 |

(Continued)

*Primary Examiner* — Omkar Deodhar
*Assistant Examiner* — Wei Lee
(74) *Attorney, Agent, or Firm* — H.C. Park & Associates, PLC

(57) ABSTRACT

A method and a system are disclosed. The method that is executed by a game service platform server managing a plurality of games for searching game challenge opponents includes: receiving a game challenge opponent request, on the game service platform server, generated according to a motion of a first terminal from the first terminal; receiving a position of the first terminal and a distance from the first terminal; searching for a second terminal based on the position and the distance; and setting the searched second terminal to be a game challenge opponent candidate and providing user information for the searched second terminal to the first terminal, wherein the game service platform server executes a game service platform managing the plurality of games and provides the game challenge opponent candidate request through the game service platform.

18 Claims, 21 Drawing Sheets

(51) Int. Cl.
*A63F 13/92* (2014.01)
*A63F 13/332* (2014.01)

(56) References Cited

U.S. PATENT DOCUMENTS

| | | | |
|---|---|---|---|
| 2011/0047237 A1* | 2/2011 | Walsh | G06Q 10/10 709/207 |
| 2012/0197857 A1* | 8/2012 | Huang | G06F 3/0488 707/706 |
| 2012/0214568 A1* | 8/2012 | Herrmann | 463/16 |

FOREIGN PATENT DOCUMENTS

| | | |
|---|---|---|
| JP | 2008-012072 | 1/2008 |
| JP | 2008-073264 | 4/2008 |
| JP | 2011-160836 | 8/2011 |
| KR | 2003-0088621 | 11/2003 |

\* cited by examiner

SYSTEM, METHOD AND COMPUTER READABLE RECORDING MEDIUM FOR SEARCHING GAME CHALLENGE OPPONENTS BASED ON ACTION OF USER

CROSS-REFERENCE TO RELATED APPLICATIONS

This application claims priority from and the benefit of Korean Patent Application No. 10-2011-0139274, filed on Dec. 21, 2011, which is hereby incorporated by reference for all purposes as if fully set forth herein.

BACKGROUND

Field

The present invention relates to a method, a system, and a computer readable recording medium for searching game challenge opponents based on an action of a user, and more particularly, to a method, a system, and a computer readable recording medium for searching game challenge opponents based on a user selecting a "challenge to neighboring persons" to search for challenge opponents, searching, and providing the neighboring persons as challenge subjects by an action of a user terminal, through a game service platform providing a plurality of game services.

Description of Related Art

A smart phone is an intelligent cellular phone having computer support functions added to the cellular phone. The smart phone has a personal digital assistant (PDA) function, the Internet function, a moving picture reproducing function, and the like, added thereto while satisfying cellular phone functions. The smart phone includes various input schemes and touch screens to provide an interface that is more convenient for use. Since the smart phone supports a wireless Internet, it also accesses the Internet and a computer to perform as a terminal, such as an E-mail application, a web browsing application, a fax application, a banking application, a game application, and the like. The smart phone also has a standardized operating System (OS) or a dedicated operating system in order to accommodate various applications.

As implementation of various applications has been enabled through various user terminals, such as, the smart phone and the like. Various application programs and contents for the user terminal apparatus have been developed. As the applications of the user terminals have been improved and many mobile games are played in an environment similar to a web environment have been developed. Therefore, many network games in which users accessing a network through their user terminals may play the same game together have been developed. In this case, generally, game clients are deployed in user terminals or client terminals (for example, smart phones) and connected with each game server through a wired and wireless communication network to perform a corresponding game on the user terminals.

Korean Patent Laid-Open Publication No. 2003-0088621 (entitled "SYSTEM FOR CONNECTING WIRELESS GAME BY CONDITION MATCHING OF PARTICIPANT AND SMS AND METHOD THEREFOR)" to WISPOST, INC describes technology of connecting the same game among smart phone users through the wireless Internet (Document 1). Document 1 describes a game relaying system for informing unspecified users that intend to participate in a game in the wireless Internet by a short message service (SMS). The unspecified users may participate in the game when conditions of the unspecified users match and immediately connecting recipients with each other when the recipients participate in the game.

The technology of Document 1 has problem: participation in the game is possible only when a real time battle among matched game participants is possible; and when the game connection is not made in real time due to a time delay or the like, the user is required to wait for a short message service response or the like frequently. Since a battle with an opponent ends only at the time of each connection, a record may not be updated in a game or the like, where a game victory or defeat is determined through a repetitive record such as a recording game or the like. Therefore, record updating is problematic. Further, since the matching with the game opponent is implemented only in a specific game, it is impossible to play another kind of game or match with a user that has not played a corresponding game.

Furthermore, the method for matching a battle opponent according to the related art includes a series of processes in which the user accesses a server, searches another user in the server, and seeks an agreement in order to provide information on another user that the user wants to form a connection with, which is troublesome, requires a high cost, and requires a large amount of time in an information provision and agreement process.

SUMMARY

The present teachings disclose searching for game challenge opponents with a motion, such as, a motion which shakes a user terminal or a user terminal collides with an opponent's user terminal on a game service platform that is managing a game service in interconnection with a plurality of games provided in the user terminal.

The present teachings disclose searching for game challenge opponents to the user using position information of a user terminal and distance information set by the user. A game challenge opponent search request can be generated through a motion of the user terminal on a game service platform managing a game service in interconnection with a plurality of games provided in the user terminal.

The present teachings disclose searching for game challenge opponents using a using a transmission or arrival time of a game challenge opponent search request on a game service platform.

The present teachings disclose searching for game challenge opponents based on an action of a user using a local time of a user terminal when a game challenge opponent search request is transmitted or received on a game service platform when position information of the user terminal is not accurate.

The present teachings disclose searching for game challenge opponents based on an action of a user to decrease a waiting time of a game challenge opponent search by confirming challenges from other user terminals per a preset update time during a time set by the user to provide a search result of game challenge opponents on a game service platform.

According to exemplary embodiments, there is provided a method that is executed by a game service platform server managing a plurality of games for searching game challenge opponents. The method including: receiving a game challenge opponent request, on the game service platform server, generated according to a motion of a first terminal from the first terminal; receiving a position of the first terminal and a desired distance from the first terminal; searching for a second terminal based on the position and the desired distance; and setting the searched second terminal to be a game challenge opponent candidate and providing user information for the searched second terminal to the first terminal, wherein the first and the second terminals are configured to execute a game service platform for managing the plurality of games and providing the game challenge opponent candidate.

According to exemplary embodiments, there is provided a system including a game service platform server managing a plurality of games for searching game challenge opponents based on an action of a user. The game service platform server includes: a request receiving unit on the game service platform server configured to receive a game challenge opponent request generated according to a motion of a first terminal from the first terminal; an information providing unit configured to receive a position of the first terminal and a desired distance from the first terminal; a terminal confirming unit configured to search for a second terminal based on the position and the desired distance; and a user information providing unit configured to set the searched second terminal to a game challenge opponent candidate and providing user information for the searched second terminal to the first terminal, wherein the first and the second terminals are configured to execute a game service platform for managing the plurality of games and providing the game challenge opponent candidate.

According to exemplary embodiments, there is provided a non-transitory computer-readable storage medium comprising an executable program which when executed by a game service platform server managing a plurality of games searches game challenge opponents by performing the following steps: receiving a game challenge opponent request, on the game service platform server, generated according to a motion of a first terminal from the first terminal; receiving a position of the first terminal and a desired distance from the first terminal; searching for a second terminal based on the position and the desired distance; and setting the searched second terminal to be a game challenge opponent candidate and providing user information for the searched second terminal to the first terminal, wherein the first and the second terminals are configured to execute a game service platform for managing the plurality of games and providing the game challenge opponent candidate.

According to exemplary embodiments, there is provided a method that is executed by a processor, the method including: receiving a game challenge, on the processor, initiated by a motion of a first user terminal; receiving a position of the first user terminal and a desired distance; searching to generate a list of challenge candidate user terminals that are within the desired distance of the position; providing user information associated with each of the challenge candidates to the first terminal; and setting at least one of the challenge candidates as an opponent of the first user terminal.

Information for receiving the method for searching game challenge opponents based on an action of a user may be stored in a server computer readable recording medium. The recording medium may include all kinds of recording media in which a program and data are stored so as to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). The recording medium may be distributed in a computer system connected by a network, such that a computer readable code may be stored and executed in a distributed scheme.

It is to be understood that both the foregoing general description and the following detailed description are exemplary and explanatory and are intended to provide further explanation of the invention as claimed.

BRIEF DESCRIPTION OF THE DRAWINGS

FIG. 16 illustrates a procedure of searching game challenge opponents based on an action of a user according to;

DETAILED DESCRIPTION OF THE ILLUSTRATED EMBODIMENTS

Figure 1:
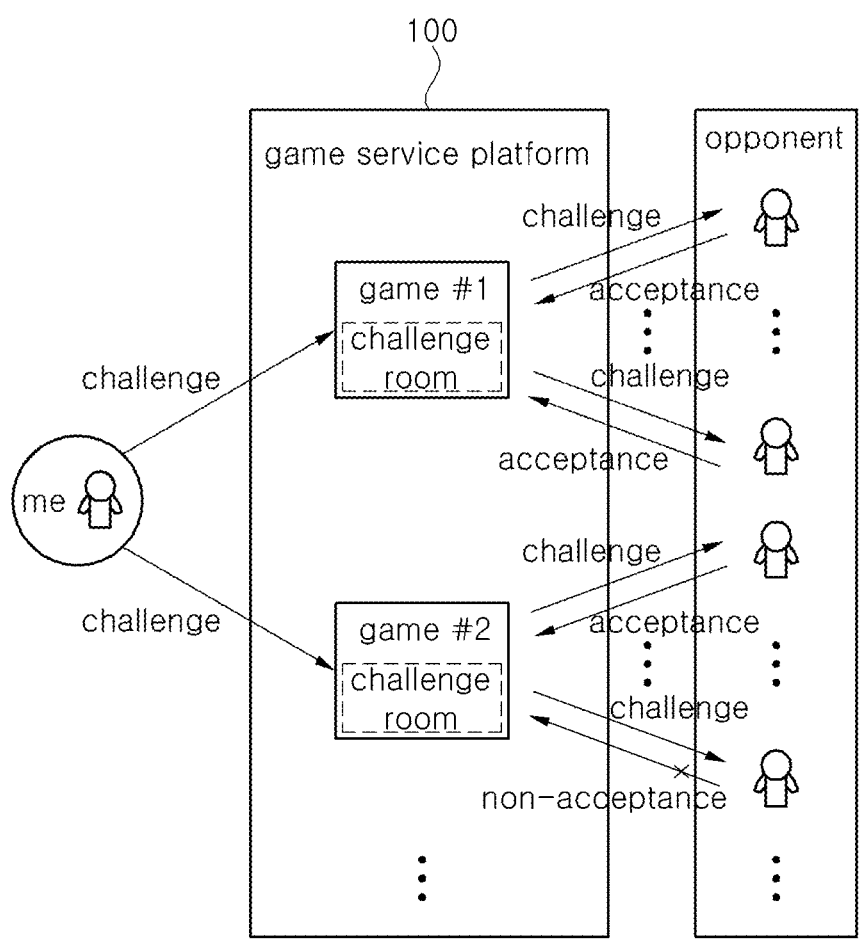
FIG. 1 illustrates a concept of providing a game through a connection with a challenge opponent according to exemplary embodiments.

Exemplary embodiments of the present invention will be described in detail with reference to the accompanying drawings. These exemplary embodiments will be described in detail for those skilled in the art in order to practice the present invention. It should be appreciated that exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. It should be understood that position and arrangement of individual components in each disclosed exemplary embodiment may be changed without departing from the spirit and the scope of the present invention. Therefore, a detailed description described below should not be construed as being restrictive. The scope of the present invention is defined only by the accompanying claims and their equivalents if appropriate. Similar reference numerals will be used to describe the same or similar functions throughout the accompanying drawing.

It will be understood that for the purposes of this disclosure. "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

A method and a system for providing a game through a connection with a challenge opponent capable of providing a game by selecting a challenge game and a challenge opponent is disclosed. A game challenge to the selected opponent on a game service platform managing a game service in interconnection with a plurality of games is disclosed. Particularly, the present invention suggests a method and a system for searching game challenge opponents, for example, with an action of generating a motion, such as, a motion in which a user shakes his/her user terminal or allows his/her user terminal to collide with an opponent's user terminal on a game service platform. A game record among users simultaneously moving their user terminals may be confirmed through matching. Other users providing confirmation by shaking their user terminals at the same time may be searched and selected as challenge opponents. When the user terminal is shaken, position information of the user may be confirmed and other users subscribing to a neighboring game service platform may be recommended.

A method of searching game challenge opponent candidates and selecting a challenge opponent among the searched challenge opponent candidates is performed on the game service platform interconnected with the plurality of games. One can select a specific game among the plurality games provided on the game service platform before determining the challenge opponent. The challenge opponent may be a user that has experienced or installed the selected game or a user that has experienced another game on the game service platform but has not experienced the selected game. When the selected game is not installed in the user terminal of the challenge opponent a procedure of automatically downloading and installing installation software of the game may be added.

A challenge proposer may set the number of challenge opponents and a challenge period. The game can be performed several times during the challenge period, thereby generating a competitive spirit among the challengers. The present teachings may also be applied to a record game played by the respective challengers to calculate records rather than the game played in real time among the challenge opponents. Records updated by the respective challengers during the challenge period may be reported in real time to the user terminals, for example, smart phones, of other challengers and/or the challenge proposer.

When the challenge period has ended, a challenge result may be provided to the user terminals of the players and the players may directly inquire and view the challenge result. A predetermined point or various kinds of benefits may be provided to the players according to the challenge result.

Information related to the challenge may be interconnected with a Social Network Service ("SNS") to be shared through a corresponding SNS page. By using the SNS service a human network among the respective game users may be expanded.

A method for selecting challenge opponents may be variously implemented. For example, the server may match rivals to an ability of a user and recommend matched rivals as the challenge opponents or search other users positioned in the vicinity of the user, or the user may select friends registered by him/her as the challenge opponents. Further, the server may also randomly use these various methods to determine and provide opponents.

A method for searching for other users positioned in the user's vicinity is provided. The other users are searched using position information of the user terminal, distance information set by the user, time information, and the like.

The following disclosure uses the term "smart phone." However, the present invention may be applied to any user terminal capable of providing a function of the present invention including all user terminals capable of executing an application, including a fixed terminal such as a computer, a television, or the like, as well as a mobile terminal such as a cellular phone, a laptop computer, a digital broadcasting terminal, a personal digital assistant (PDA), a portable multimedia player (PMP), a navigation apparatus, or the like.

A "game service platform" encompasses a software framework (including an application program framework) providing each game related information and integrated management of services in interconnection with at least one game program (preferably, a plurality of game programs). The game service platform may become a basis on which each individual game software may be executed and allow execution of the program without being limited to a specific operating system.

The game service platform can be deployed in the smart phone to integrate and manage game software and provide various services in interconnection with game software. For example, the game service platform provides an interface allowing each user to access each game and provides various records and statistical data related to each game. Various methods capable of searching challenge opponents are provided. Processes such as a challenge proposal process, a challenge acceptance process, and the like, are described, and various challenge related information according to setting and progress of the challenge is stored and managed in a memory and is provided to each user terminal in real time or by a request. The user may move the user terminal on the game service platform to search other users positioned in the user's vicinity, thereby requesting other users for the challenge.

Hereinafter, exemplary embodiments of the present invention will be described in detail with reference to the accompanying drawings so that those skilled in the art may implement the present invention.

A game service platform managing information on each game in interconnection with a plurality of games, processing information related to the challenge, and providing various related service, and a method of searching the challenge opponents through the game service platform and progressing the challenge is disclosed. The present teachings may be implemented in each game program without installing a separate game service platform in the smart phone. The present teachings may be implemented on the game service platform in order to determine a game to challenge, search and select challenge opponents, and progress a challenge according to challenge proposal and acceptance.

Concept of Game Service Platform

The game service platform may allow a service user to selectively use a plurality of games through an integrated log-in process, and integrate and manage information related to the plurality of provided games. The game service platform can thus facilitate challenge related procedure progress and related information management according to exemplary embodiments of the present invention.

The game service platform may allow the service user to register an acquaintance as a game friend and allow the service user to access a game played by the acquaintance or play the played game with the acquaintance through the registered game friend. Further, the game service platform may allow the service user to play a specific game with a stranger accessing the specific game. The game service platform may register the stranger playing the game as a game friend, thereby forming a social network based on the specific game.

The service user, the service, and the game are interconnected through the game service platform and expand a relationship among the service users, thereby increasing satisfaction with the game. Further, a game oriented service capable of continuing an experience and a value may be provided through the game service platform according to exemplary embodiments of the present invention.

A challenge related menu and service may be implemented as a menu after the game service platform is executed. The challenge related menu and service may be implemented as a separate application and be executed in interconnection with the game service platform.

Concept of Connection with Challenge Opponent

FIG. 1 illustrates a concept of providing a game through connection with a challenge opponent according to exemplary embodiments. A game service user may access a plurality of games through the game service platform to play the games. The game service platform integrates and manages the plurality of games and provides a channel capable to selecting and playing the respective games to the service user.

The service user selects a specific game and selects an opponent to challenge through the game service platform. The opponent receiving the challenge proposal may or may not accept the challenge proposal.

A challenge room corresponding to the challenge is generated, and the service user that has proposed the challenge and the opponent that has accepted the challenge are registered in the challenge room. With the challenge room, a play result of the corresponding game is managed and various services related to the challenge are provided. An opponent that has not accepted the challenge may also be registered in the challenge room, such that the same challenge procedure may progress with respect to the opponent that has not accepted the challenge. Processing for the challenge result may not be provided to the opponent that has not accepted the challenge.

The service user may set the number of challengers and a challenge period with respect to one challenge. The service user may propose the challenge to a plurality of opponents. A plurality of challenge rooms may be generated with respect to the same game and a plurality of challenge rooms may be generated according to several challenge proposals at the same time with respect to each of a plurality of games.

Figure 2:
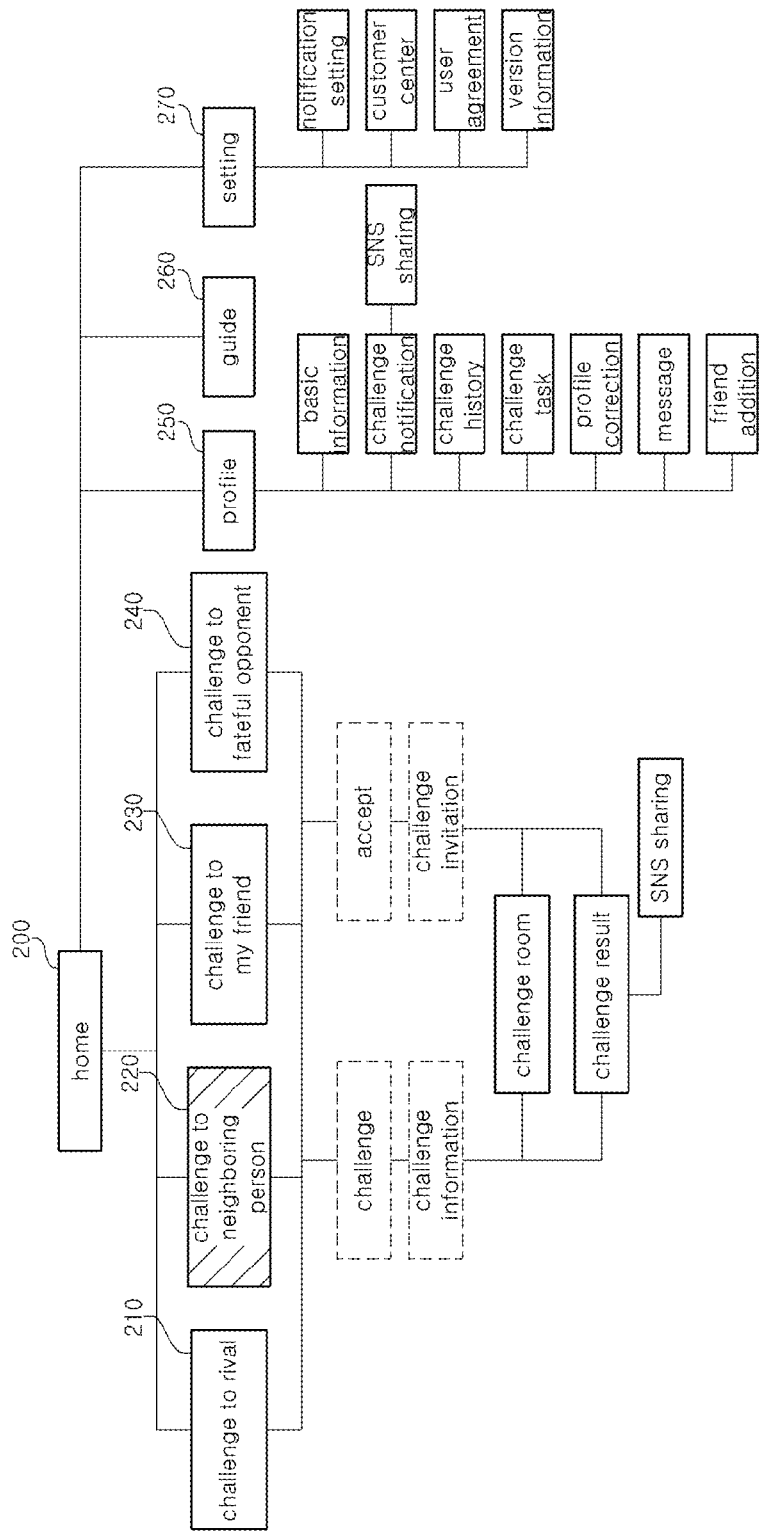
FIG. 2 illustrates a menu implementation through a game service platform according to exemplary embodiments.
Figure 6:
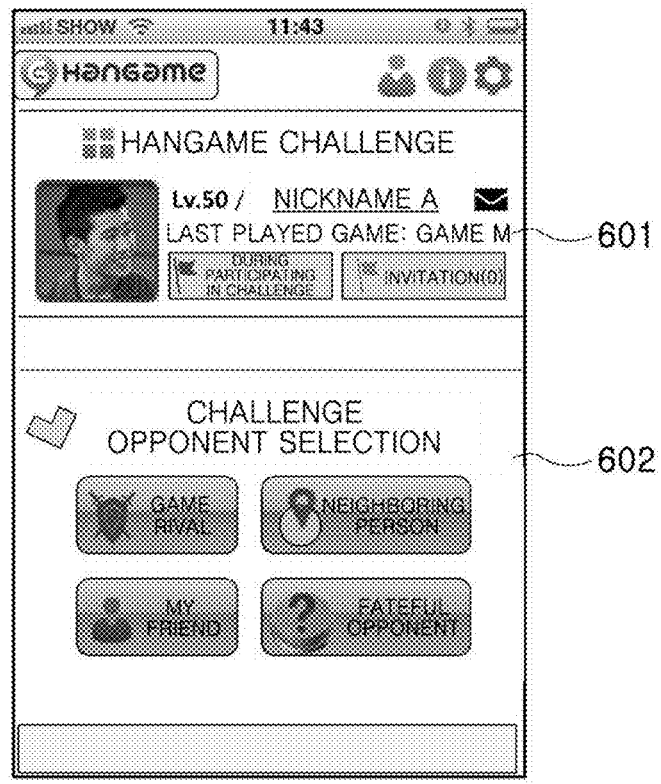
FIG. 6 illustrates a "challenge opponent selection" screen according to exemplary embodiments.

FIG. 2 illustrates a menu implementation through a game service platform according to exemplary embodiments. After log-in is completed through a home menu 200 of the game service platform (or a home menu of a challenge service), various menus capable of searching challenge opponents may be displayed as shown in FIG. 6.

Figure 9:
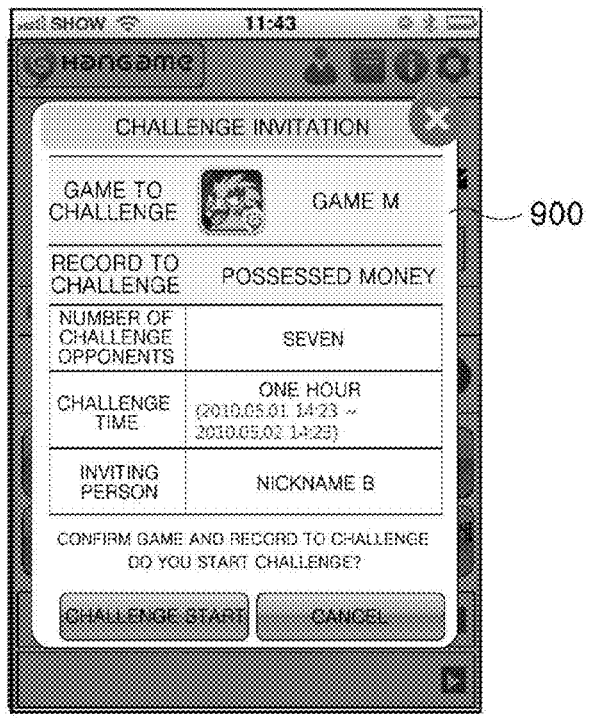
FIG. 9 illustrates a "challenge invitation screen" according to exemplary embodiments.

When a challenge proposal selects the challenge opponent search menus to search the challenge opponents and select a specific opponent as a challenge subject, the challenge proposal is executed. The challenge proposer sets various parameters, for example, the number of challenge participants, a challenge progress period, and the like, on the challenge. The challenge opponent receiving the challenge proposal may accept or reject the challenge proposal, confirm a challenge invitation as shown in FIG. 9, and start the challenge.

When the challenge starts the challenge room is generated. A record for the challenge is managed as the challenge progresses. A challenge result is generated after the challenge ends, such that the challenge result may be transmitted to or viewed by the challenge participants. The challenge result is interconnected with the SNS service so that information may be shared.

A method of searching and challenging the challenge opponent may be variously implemented. The method of searching and challenging the challenge opponent may be implemented with various methods, such as, a challenge to rival 210, a challenge to neighboring person 220, a challenge to my friend 230, a challenge to fateful opponent 240, and the like. The "challenge to rival" menu 210 searches and recommends persons having a game ability similar to a game ability of the service user. The "challenge to neighboring person" menu 220 searches and recommends users positioned in the vicinity using position information of the user terminal. The "challenge to my friend" menu 230 searches and recommends friends for the service user in, for example, the game service platform, the challenge service, the games, an address book, or a phone book. The "challenge to fateful opponent" menu 240 randomly selects one of the search methods described and recommends a challenger. When the "challenge to neighboring person" menu 220 is selected, a motion of the user terminal is sensed and neighboring users are searched using their position information or the like, thereby making it possible to execute the game challenge.

A profile menu 250 capable of viewing and correcting various profiles of the service user, a guide menu 260 to guide a service, and a setting menu 270 to change various settings can be provided. The profile menu 250 may include detailed items, such as, basic information, a challenge notification, a challenge history, a challenge task, a profile correction, a message, friend addition, and the like. The challenge notification item may be displayed with respect to an event in which the service user proposes the challenge or receives the challenge. A recent challenge history and a recent challenge task may be confirmed through the challenge history item or the challenge task item. In the setting menu 270, notification methods, notification periods, and the like of various notifications related to the challenge progress may be set. Exemplary settings include a challenge invitation notification, a challenge end notification, a friend addition notification, a challenge opponent record notification, and the like.

Configuration of Entire System

Figure 3:
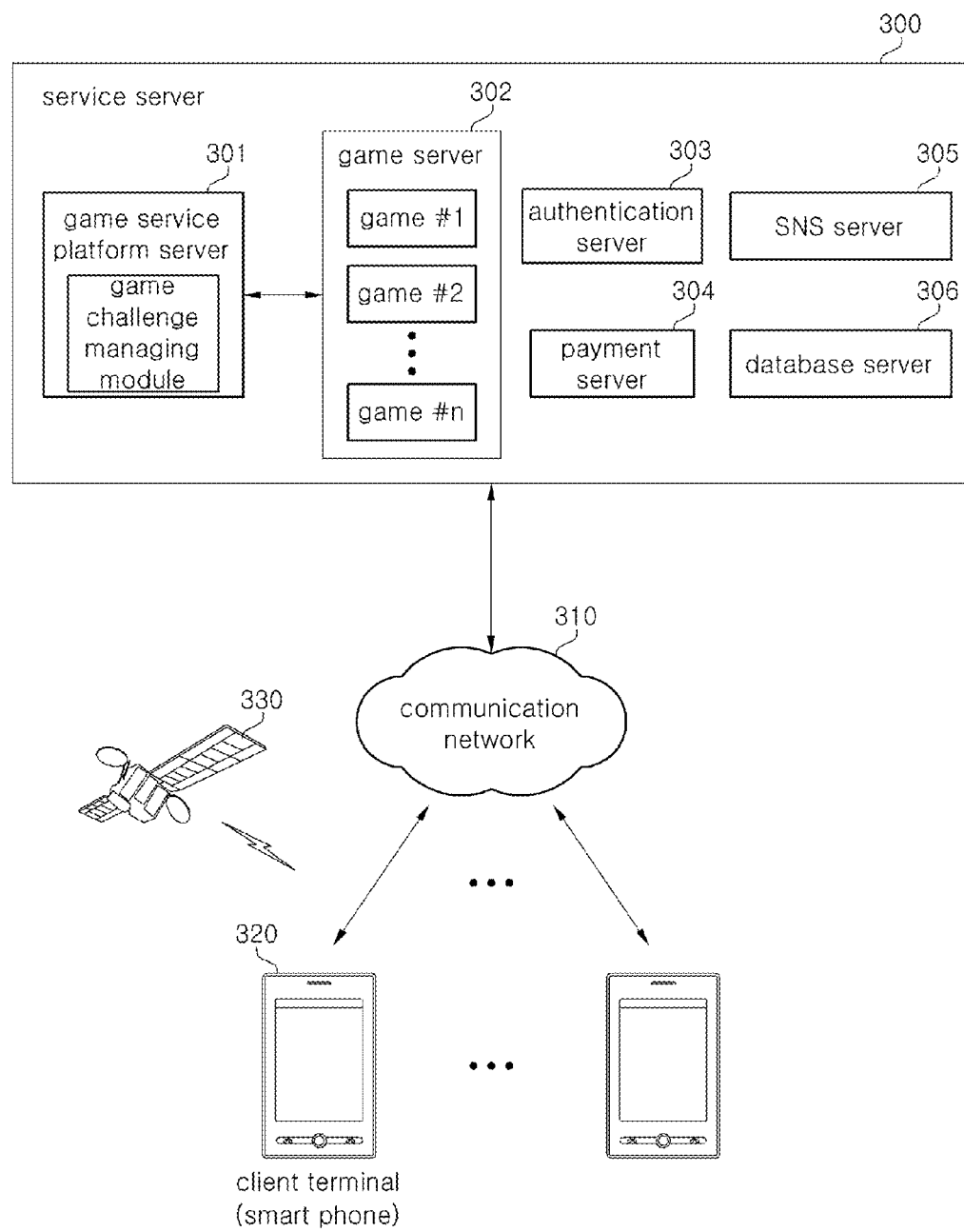
FIG. 3 illustrates a system for providing a game through the connection with a challenge opponent according to exemplary embodiments.

FIG. 3 illustrates a system for providing a game through the connection with a challenge opponent according to exemplary embodiments.

A service server 300 of a service operator is connected with a plurality of user terminals 320, for example, smart phones or client terminals, using a communication network 310. The service server 300 may include a game service platform server 301, a game server 302, an authentication server 303, a payment server 304, an SNS server 305, a database server 306, and the like. The game server 302 may perform functions for a plurality of games, each driven through the client terminals 320.

The communication network 310 may use a variety of network media, for example, wired communication, wireless communication, a personal area network (PAN), a local area network (LAN), a metropolitan area network (MAN), a wide area network (WAN), or the like. The communication network 310 may comprise the World Wide Web (WWW). Communication network 310 can comprise a wireless transmitting technology used for a short range communication, such as, an infrared data association (IrDA) or a Bluetooth connection.

The game service platform server 301 works with the game server 302 and provides a game service platform to the client terminals 320. Particularly, the game service platform server 301 provides for searching the challenge opponent and progressing with a battle with the selected challenge opponent. Exemplary embodiments of the game service platform server 301 are further described in FIG. 4.

The game server 302 may provide programs and information related to each game to the client terminals 320. Client terminals 320 may download game applications for each corresponding game from the game server 302, and install and execute the game applications in the client terminals 320. The game server 302 may install the game application in the client terminal 320 and update an old version of game application. The game application may be downloaded from a dedicated download server (not shown) or another server in the system, for example, the game service platform server 301. Further, when the user selects a challenge opponent for a specific game and proposes a challenge, when the corresponding game is not installed in a client terminal of the challenge opponent, the game server 302 automatically downloads and installs the corresponding game.

The authentication server 303 performs authentication for the client terminals 320. The authentication server 303 performs authentication for the game service platform server accessing authentication for the client terminals 320. The authentication server 303 performs authentication for the game accesses, and the like. The game service platform server 301 or the game server 302 provides various corresponding servers to the client terminals according to the authentication result.

The game server 302 including the plurality of games may calculate a game progress time and a game limit time and provide the calculation result to the client terminal 320. This may be used to implement a free trial feature allowing the user to play a game free of charge for a predetermined period or time. This feature can allow the user to play a game only for a limited time through a time based charge, or the like. When a specific game is charged as a paid game, the game server 302 provides the corresponding game after a payment is normally made through the payment server 304. The authentication server 303 may continuously communicate with the server side in order to continuously maintain a network connection during game progress. The game server 302 may judge that the network connection is continued through communication with the client terminal 320.

The SNS server 305 can provide a Social Networking Service (SNS), (or example, a "me2 day" service, and provide subscriber information to the game service platform server 301 according to the exemplary embodiment of the present invention. Information such as a challenge result or the like may be shared with the SNS service at the time of progress of the challenge service through the game service platform server 301.

The present invention may interwork with the SNS server 305 operated by the same operator as that of the game service platform server 301 or provide a function of providing information related to SNS services by interworking with SNS servers provided by other operators outside the service server 300.

The database server 306 stores various information required for providing the gamer service platform and the plurality of games to the client terminal 320. The database server 306 provides requested information according to requests of the game service platform server 301, the game server 302, the authentication server 303, the payment server 304, the SNS server 305, and the like. The requested information may include game service platform execution related information, game application execution related information, authentication information including user information, game related information, challenge related information, and the like.

The game application execution related information may include information required to execute the game application, whether or not the game application has been downloaded in the client terminal 320, a version of the game, an internet protocol (IP) address of the game server 302, and the like. The authentication information can access user information. The user information can include unique user information for judging whether or not a rightful user has requested access to the game, terminal unique information for judging whether or not the game has been executed in an authenticated client terminal 320, and the like. The game information may include user information, such as, an identifier, a nickname, an avatar, an age, sex, a class, a score, a ranking, a point, and the like. The game information may include information on whether the user has passed through a specific step or has accomplished a specific mission, information on whether or not a trial is a free trial, and information on a game limitation time, and the like.

Figure 4:
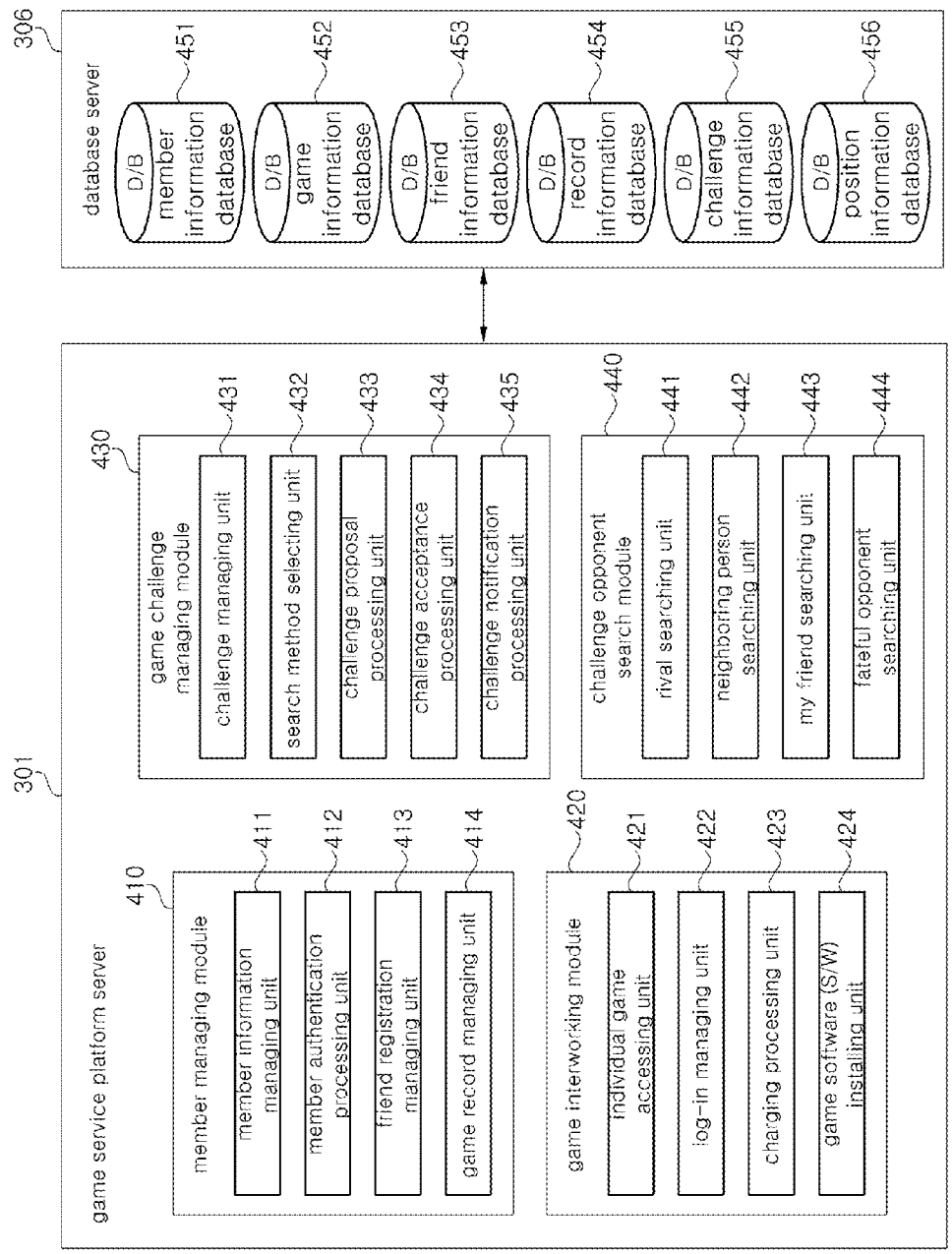
FIG. 4 illustrates detailed structures of a game service platform server and a database server according to exemplary embodiments.

The database server 306 may include a plurality of databases as shown in FIG. 4, and a database including some information or all information may also be positioned in the client terminal 320.

A challenge related server (not shown) can provide processing for the challenge service may be added. The challenge related server may be included in a module form in the game service platform server 301 or be included in the game server 302, or the like, as shown in FIG. 3. In some embodiments, service server 300 includes six detailed servers 301, 302, 303, 304, 305, and 306, these six servers may be integrated with or separated from each other, servers performing some features may also be omitted, and a server having an additional feature as described above may also be added. Therefore, in some embodiments, the service server 600 may be configured as one or more server instead of the six servers.

The client terminal 320 according to the exemplary embodiment of the present invention may be any digital device having an input/output function for communicating with the service server 300 through the communication network 310. The client terminal can include a memory unit and a microprocessor mounted therein to have calculation capability, such as, a desktop computer, a laptop computer, a workstation, a palmtop computer, a personal digital assistant (PDA), a web pad, a mobile communication terminal including the smart phone, or the like.

The client terminal 320 may measure its position through a global positioning system (GPS) satellite 330 The position information of the client terminal 320 measured in the client terminal 320 is transmitted to the service server 300 through the communication network 310 when the search for the challenge opponent is requested by, for example, moving the client terminal 320. The game service platform server 301 of the service server 300 receives the position information transmitted from the client terminal 320 and time information for when the search is requested.

Game Service Platform Server

According to exemplary embodiments, the game service platform server 301 may be configured to include a member managing module 410, a game interworking module 420, a game challenge managing module 430, and a challenge opponent search module 440. The database server 306 storing and transmitting various data by interworking the game service platform server 301 may be configured to include a member information database 451, a game information database 452, a friend information database 453, a record information database 454, a challenge information database 455, a position information database 456, and the like.

The member managing module 410 manages personal information that the users registers when they subscribe as members to the game service platform or the individual games. The member managing module 410 manages information on friends registered by each member, game records performed during the challenge, and the like. The personal information includes information on a kind of installation game indicating which game each member installs. The game interworking module 420 may allow the game service platform server 301 to interwork with the individual games of the game server 302, and allow log-in and charging for the individual games to be integrated and processed in the game service platform. The game challenge managing module 430 searches the challenge opponent, proposes the challenge to the challenge opponent, and processes various functions related to the challenge progress according to acceptance of the challenge. The challenge opponent search module 440 performs a function of searching the challenge opponents by each search method selected by the user. An additional feature processing module (not shown) processing additional features including an SNS interworking processing feature, a message transmission processing features, an advertisement providing features, and the like, may be further included in the game service platform server 301.

In this case, some or all of the detailed functions units included in the respective modules 410, 420, 430, and 440 may be included in a service platform client application installed in the client terminal 320, and some functions of the detailed feature units may interwork with each other or be distributed and processed by the server and the client system.

First, the member managing module 410 may include a member information managing unit 411, a member authentication processing unit 412, a friend registration managing unit 413, a game record managing unit 414, and the like. The member information managing unit 411 stores various member related information input when a user accesses the game service platform server 301 to subscribe the service through the game service platform in the member information database 451 or updates member related information corrected through an information home.

The member authentication processing unit 412 performs authentication by interworking with the authentication server 303 when the users subscribing as the member to the game service platform or the games log in the game service platform or the games. The friend registration managing unit 413 performs a function of managing game friends of corresponding members registered by various methods. The game record managing unit 414 performs a function of managing the respective game records related to the challenge of the corresponding members, or all game records.

The game interworking module 420 may include an individual game accessing unit 421, a log-in managing unit 422, a charging processing unit 423, a game software (S/W) installing unit 424, and the like. The individual game accessing unit 421 accesses a specific game when the specific game is selected among a plurality of games provided in the game server 302 interworking with the game service platform server 301. The log-in managing unit 422 integrates and processes log-ins of the games or the log-ins of the games when the users access the games through the game service platform. The charging processing unit 423 charges for a specific game by interworking with the payment server 304 when the specific game is a paid game. The game S/W installing unit 424 is executed by a challenge acceptance processing unit 434 to proceed to a game S/W installing step and then install S/W of the corresponding game, when the S/W of the corresponding game is not installed in the client terminal when the user receiving the challenge proposal accepts the challenge or when the user accepts the challenge and intends to access the corresponding game according to the exemplary embodiment of the present invention.

The game challenge managing module 430 may include a challenge managing unit 431, a search method selecting unit 432, a challenge proposal processing unit 433, a challenge acceptance processing unit 434, a challenge notification processing unit 435, and the like. The challenge managing unit 431 performs processing related to the challenge progressed according to the exemplary embodiment of the present invention. Particularly, the challenge managing unit 431 receives challenge related information, for example, the number of challengers, a challenge period, a challenge object, and the like, set by the challenge proposer, and stores and manages them in the challenge information database 455.

The search method selecting unit 432 provides an interface so that the user (the challenge proposer) selects one of various challenge opponent search methods and receives a selection signal for the search method input to command the challenge opponent search module 440 to perform the search according to the selected search method. The challenge opponent can be a user accepting the game challenge to play the game, only members installing at least one game may be searched as the challenge opponents. However, the challenge proposer is not limited to the members installing the selected game. When the challenge proposer only installs the selected corresponding game and has not yet played the game once game record information is not present and a game level of the challenge opponent may not be present. Record information (game level) of the challenge proposer for the corresponding game may be confirmed, and record information (game level) of the challenge opponent may be set to be positioned in a range set from the record information (game level) of the challenge proposer by, for example, increasing the game level of the challenge proposal by 10% or adding 10 to the game level of the challenge proposer. The record information (game level) arbitrarily set as described above may be used when the challenge proposer selects the "challenge to rival" item.

The challenge proposal processing unit 433 processes the challenge proposal to a specific user when the specific user among users (that, challenge opponent candidates) searched through the challenge opponent search module 440 is selected as the challenge opponent. For example, the challenge proposal processing unit 433 displays the challenge proposal by transmitting a message to the selected challenge opponent, transmitting an alarm, or generating a pop-up window, and discards the challenge proposal when acceptance for the challenge proposal is not processed in a set period. The challenge acceptance processing unit 434 processes the challenge acceptance, when the challenge is proposed through the challenge proposal processing unit 433. The challenge acceptance processing unit 434 registers the user accepting the challenge as the challenge opponent in the corresponding challenge room. The challenge acceptance processing unit 434 may confirm whether or not the game for the challenge has been installed in the user terminal and allow the game to be downloaded through the game S/W installing unit 424. A method of downloading the game includes a method of providing a link allowing the game to be downloaded directly from a server, a method of performing a direct connection with the corresponding link, a method of executing a program capable of downloading the corresponding game, such as iTunes or Android market, or the like, but is not limited thereto. After the game is downloaded, the processing for the challenge acceptance is again performed. The challenge notification processing unit 435 performs notification processing to the user terminals of the corresponding challenge proposer and/or the respective challenge opponents through various means (for example, a pop-up window, a message, a short message, an image of a background screen, a text, an alarm, and the like) at the time of occurrence of various events (for example, challenge start, challenge end, record updating, object accomplishment, and the like) related to the challenge progress when the challenge starts.

As described above, the units of the game challenge managing module 430 provide various features related to the challenge progress by various methods.

The challenge opponent search module 440 receives selection information for a specific search method from the search method selecting unit 432 of the game challenge managing module 430 and searching for the challenge opponent according to the corresponding search method.

For example, when the challenge proposer selects the "challenge to rival" item, a rival searching unit 441 searches users having ability or record that is the most similar to that of the challenge proposer and displays the search result. The record information of the challenge proposer for the corresponding game is confirmed through the record information database 454, and the users having the record in the set range based on the confirmed record information are searched and output.

When the challenge proposer selects the "challenge to neighboring person", a neighboring person searching unit 442 confirms position information of the user terminal, searches for users positioned closest to the challenge proposer among members accessing the service platform, and displays the search result.

When the challenge proposer selects the "challenge to my friend", a my friend searching unit 433 searches game friends registered through the friend registration managing unit 413 and displays the search result or searches friends stored in an address book or a phone book and displays the search result. In addition, when the challenge proposer selects the "challenge to fateful opponent," a fateful opponent searching unit 444 randomly selects one of the above-mentioned search methods to search users and display the search result.

The additional processing modules (not shown) may include an SNS interworking processing unit, a message transmission processing unit, an advertisement providing unit, and the like, so as to provide functions added to the function of the game challenge managing module 430 or various additional functions provided by the game service platform according to the exemplary embodiment of the present invention. The SNS interworking processing unit processes the game record, the challenge result record, and the like, according to the challenge progress. The message processing unit transmits various messages required at the time of executing the service platform or progressing with the challenge. The advertisement providing unit provides information or an advertisement related to various games interworking with each other through the game service platform, particularly a function of providing an advertisement to various pages related to a challenge service.

Features related to the present invention included in the game service platform server 301 may be driven by interworking with the game service platform client application installed in the client terminal, some of them may be included in the service platform client application of the client terminal 320, such that the client terminal 320 itself drives and provides the corresponding features without an operation of the server, or the client terminal 320 may receive information from the game service platform server 301, such that it proactively performs the corresponding functions. Various functions may be performed in the server, in the client terminal, or by interworking between the server and the client terminal.

Database Server

The database server 306 may include the member information database 451, the game information database 452, the friend information database 453, the record information database 454, the challenge information database 455, the position information database 456, and the like, and further include other databases required for providing the game service platform.

The member information database 451 stores personal information of members subscribing as service members or game members through the game service platform. The personal information of the members may include, for example, personal information of corresponding members, photographs of the corresponding members required for profile information, nicknames of the corresponding members, games last played by the corresponding members, kinds of games installed by the corresponding members, result or record information of the corresponding members on each game, challenge history information of the corresponding members, SNS subscription information of the corresponding members, personal information exposure setting information of the corresponding members, automatic log-in setting information of the corresponding members, and the like.

The game information database 452 stores information on the plurality of games interworking with the game service platform server 301. This information may include, for example, information on installation software information of each game, firmware upgrade software information, version information of each game, record information of each game, challenge task information of each game, interworking path information with the game service platform server 301, subscriber information on subscribers subscribing to the corresponding games, and the like.

The friend information database 453 stores information automatically registered through the game service platform or directly registered by the users and related to the game friends. This information may include, for example, ID and nickname information of the registered friend, registration path information, friend blocking information, and the like. The users playing the game together through the challenge opponent search may also be registered and stored as the friends.

The record information database 454 stores various records according to game play results of the members. Various records may include, for example, the number of plays for each game, play points of each member for each game, challenge task points, and the like.

The challenge information database 455 stores information related to the challenge progress. This information may include, for example, challenge setting information (challenge participant information, a challenger limit, a challenge time, and the like), challenge record information, challenge object information, challenger ranking information, and the like.

The position information database 456 stores position information of the client terminals 320.

Entire Service Procedure

Figure 5A:
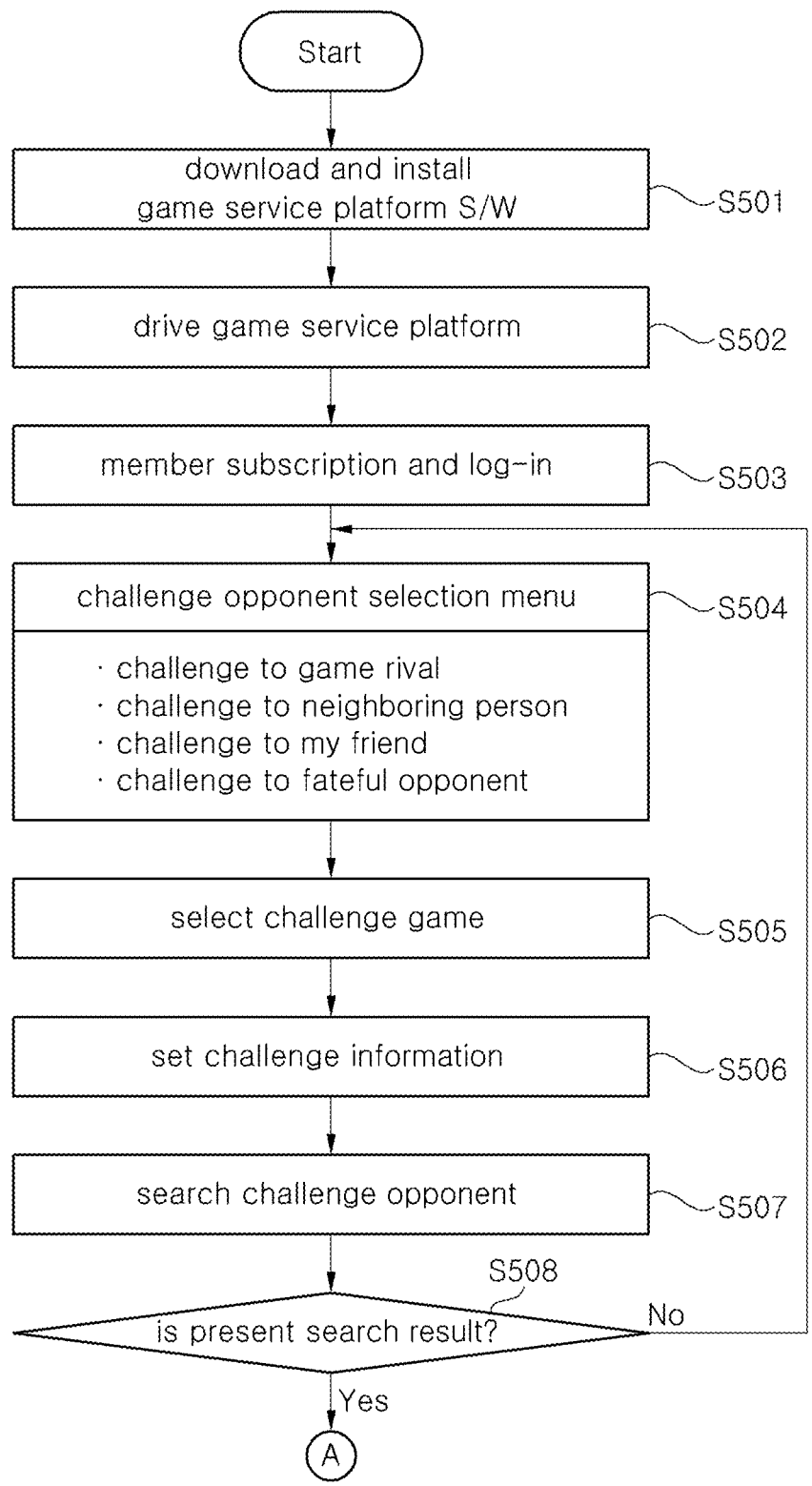
FIGS. 5A and 5B illustrate a procedure of providing a game through the connection with a challenge opponent according to exemplary embodiments.
Figure 5B:
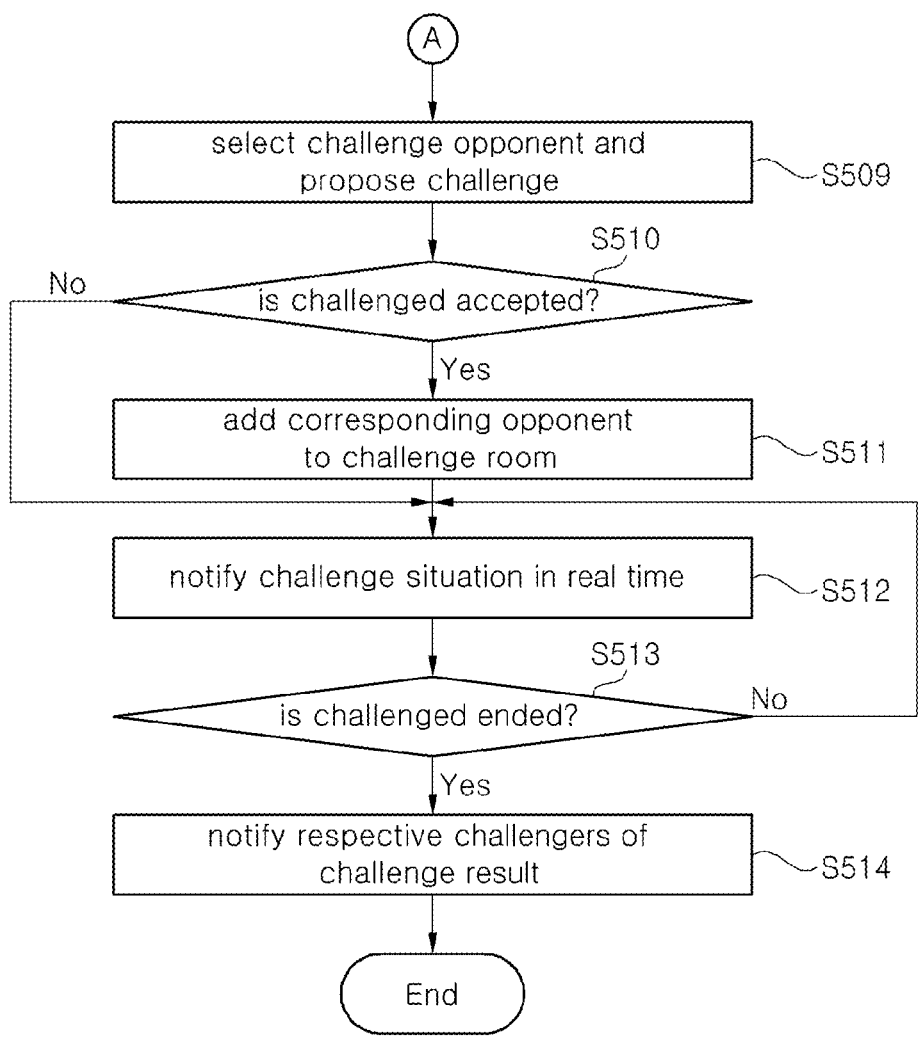

FIGS. 5A and 5B are flowcharts showing a procedure of providing a game through the connection with a challenge opponent according to the exemplary embodiment of the present invention. First, the user of the client terminal 320 (for example, the smart phone) downloads and installs the game platform software (S501) and drives the installed game service platform (S502). After the game service platform is driven, when member subscription and log-in are performed (S503), the home menu of FIG. 2 may be displayed on the client terminal 320.

Then, according to the exemplary embodiment of the present invention, the challenge opponent is searched to select a selectable menu (S504), thereby starting the challenge. For example, the challenge opponent search method such as the "challenge to game rival" (See FIG. 7), the "challenge to neighboring person" (See FIG. 8), the "challenge to my friend" (See FIG. 9), the "challenge to fateful opponent" (See FIG. 10), or the like, may be selected.

When the challenge opponent search method is selected, the game to challenge is selected in the respective challenge opponent search menus (S505), information (for example, the number of challenge participants, a challenge time, a challenge object, and the like) related to the corresponding challenge is set (S506), and the challenge opponent search (S507) is executed.

When the search is performed according to the execution of the challenge opponent search and a search result is not present, the procedure of providing a game may return to the challenge opponent selection menu (S504) to search again for the challenge opponent. When at least one user is located as the challenge opponent search result, a specific user is selected as the challenge opponent (S509).

After challenge proposal information is transmitted to the corresponding user according to the challenge proposal and the user receiving the challenge proposal accepts the challenge (S510), the user accepting the challenge is added to the challenge room (S511) to perform the challenge together.

As the challenge starts, challenge progress situations (for example, record updating, ranking change, object accomplishment, and the like) are notified to the challenges in real time (S512), thereby making it possible to stimulate a desire of the challenge participants to win. After the set challenge time elapses and the challenge ends (S513), the challenge result is notified to the challenge participants (S514).

Although not shown in FIGS. 5A and 5B, when the game for the challenge is not installed in the user terminal of the user accepting the challenge, a procedure of downloading and installing the corresponding game in various schemes may be added.

As described above, a specific game is selected through the game service platform, and the challenge is proposed and accepted, thereby making it possible to provide the challenge service. The above-mentioned process is performed, makes it possible to doubly increase an interest in the game. The challenge opponent is added as the game friend and expands the human network. Since a challenge period may be set and the game challenge may be performed several times in the corresponding challenge period, the present invention may also be applied to the case of the record game that is not a battle by real-time access. Record situations of the challenge participants are notified to the challenger participants in real time during the challenge progress, thereby making it possible to stimulate a desire of the challenge participants to win.

Implementation Example of Game Service Platform

FIGS. 6 to 12 show implementation examples of a game service platform providing functions related to challenge execution of a user terminal, for example, a smart phone, according to exemplary embodiments of the present invention.

FIG. 6 illustrates a "challenge opponent selection" screen according to exemplary embodiments. When the user executes the game service platform and accesses a challenge service home menu, challenge related information 601 and a menu 602 capable of selecting the challenge opponent are provided. For example, information on a game level of the user, an ID of the user, a game last executed by the user, and the like, whether or not the user is currently participating in the challenge, and whether or not the user has received an invitation, are displayed as the challenge related information 601. The menu 602 capable of selecting the challenge opponent may include a game rival selection menu, a neighboring person selection menu, a friend selection menu, a fateful opponent selection menu, and the like, as described above. However, the present invention is not limited thereto. The "challenge opponent selection" screen of FIG. 6 is displayed prior to the exemplary illustrations of FIGS. 7A to 7E when selecting the challenge opponent search menus.

When there is a non-participating valid invitation notification (for example, in a challengeable time period), the number of received invitation notifications may be displayed in an invitation item. When an invitation button is clicked, and the corresponding invitation is confirmed as illustrated in FIG. 9, the challenge can be accepted.

FIGS. 7A to 7E illustrate selected challenge opponent search methods according to the exemplary embodiments.

Figure 7A:
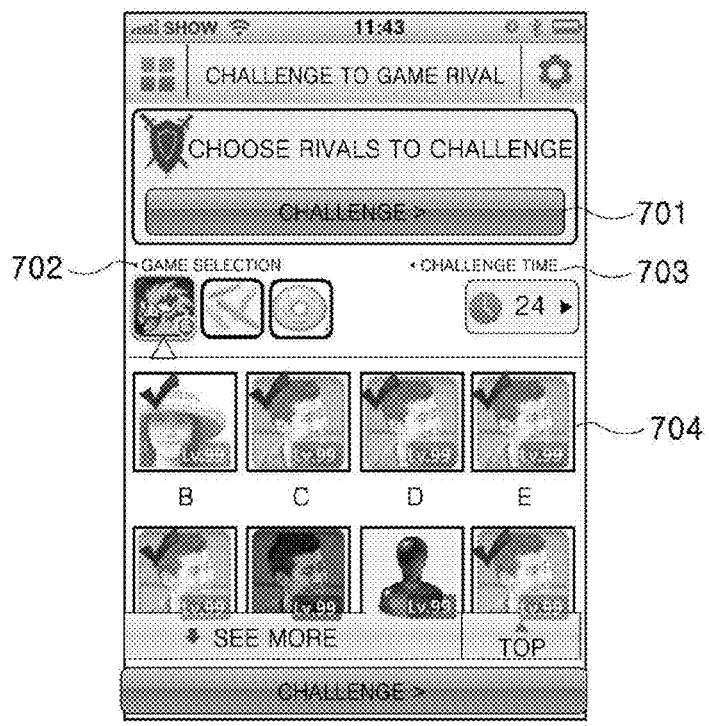
FIG. 7A illustrates a "challenge to game rival" screen according to exemplary embodiments.

FIG. 7A illustrates a "challenge to game rival" screen exemplary embodiments. According to selection of the "challenge to game rival" menus, the user searches and displays users having ability (a game level or point) similar to that of the user. Information 704 of the searched users may include an ID, a registered profile image, a level, and the like. The user selects at least one of the users located by the search, for example, by placing a checkmark at information 704 in FIG. 7A, and clicks a button "challenge", thereby starting the challenge. A challenge related game selected through a game selection item 702 may be displayed as an image, and the user may set a challenge time (for example, 10 minutes, 1 hour, 24 hours, or the like) through a challenge time item 703. When the challenge time is not set, it may be considered as a default value.

Figure 7B:
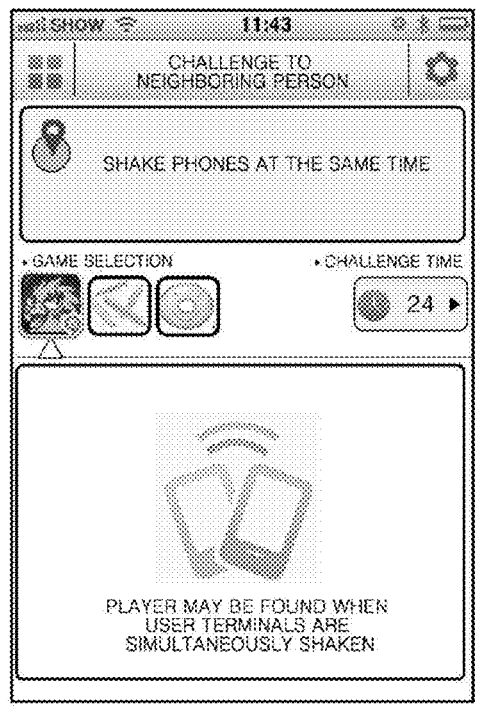
FIGS. 7B and 7C illustrate a "challenge to neighboring person" screen according exemplary embodiments.
Figure 7C:
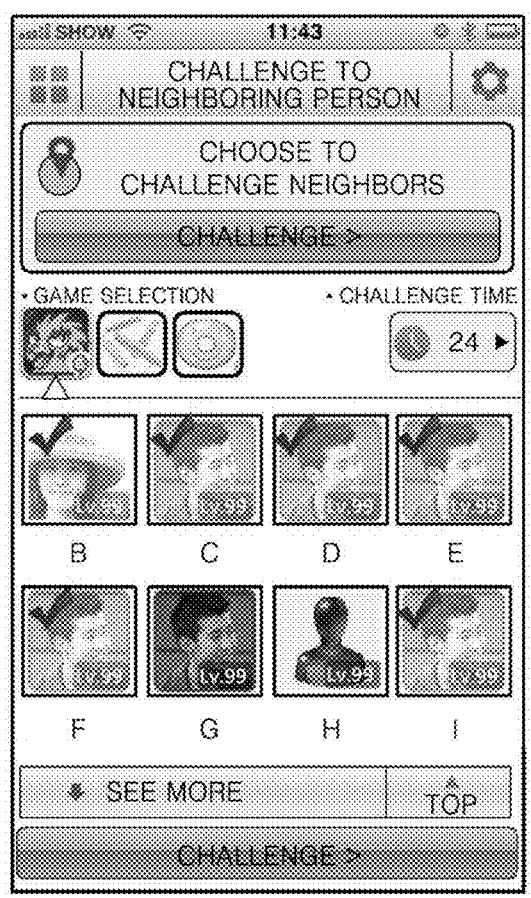

FIGS. 7B and 7C illustrate a "challenge to neighboring person" screen exemplary embodiments. Referring to FIG. 7B, according to selection of the "challenge to neighboring person" menu, when the user terminal is shook or bumped against other user terminals, other shaking user terminals together positioned in the vicinity of the user terminal or users having other user terminals against which the user terminal is bumped are searched for and recommended as challenge opponents. Position information of the user is used, thereby making it possible to search and display users positioned in the vicinity or display only users that are playing the corresponding game among the users positioned in the vicinity. Further disclosure for the "challenge to neighboring person" according to the exemplary embodiments is detailed below for FIG. 13.

FIG. 7C illustrates a list of user terminals searched by moving the user terminal as in FIG. 7B. User terminals close to or proximate a user's terminal position are searched and displayed as the search result. In this case, the user shakes the user terminal and initiates a search for user terminals positioned in the vicinity or users simultaneously shaking user terminals among other users. As described above, when the list of user terminals (and their associated users) positioned in the vicinity is provided, the user selects a specific user and clicks a "challenge" button to propose the challenge to the corresponding user.

Figure 7D:
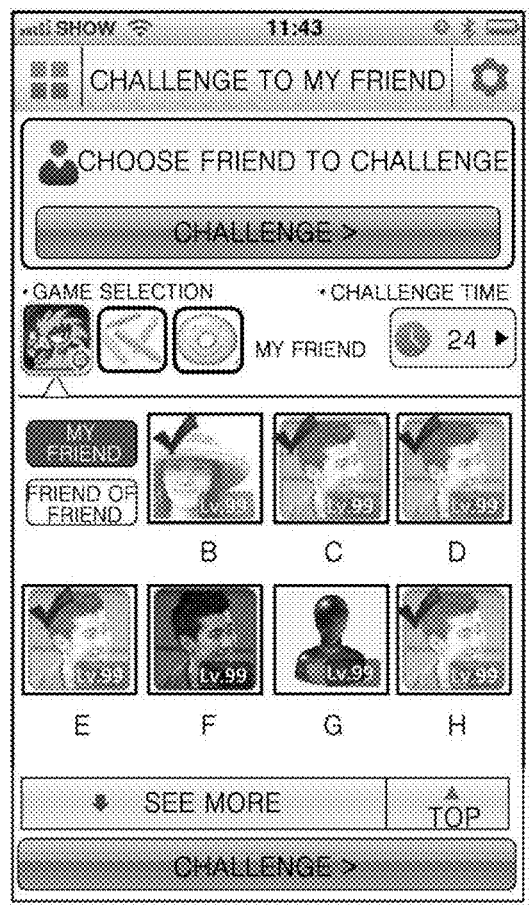
FIG. 7D illustrates a "challenge to my friend" screen according to exemplary embodiments.

FIG. 7D illustrates a "challenge to my friend" screen according to exemplary embodiments. At selection of the "challenge to my friend" menu, friends that the user registered are searched and displayed. In this case, a friend last registered by the user may preferentially be exposed or displayed, and a friend of a friend may be searched and displayed. The user terminal may be configured to preferentially expose a heterosexual friend according to search setting.

Figure 7E:
FIG. 7E illustrates a "challenge to fateful opponent" screen according to exemplary embodiments.

FIG. 7E illustrates a "challenge to fateful opponent" screen according to exemplary embodiments of the present invention. According to selection of the "challenge to fateful opponent" menu, the user may randomly select any one of the above-mentioned various search methods and the selection result is displayed. In this case, a set recommendation phrase may be provided together with the selection result. For example, when the randomly selected method is the method of searching the game rival, recommendation phrases such as "Game ability is similar to that of you. Challenge now when you would like to feel seesaw thrilling tension!", and the like, may be provided together with the selection result When the randomly selected method is the method of challenging to neighboring persons, recommendation phrases such as "Mr. XX, you played a game in the vicinity. Did you happen to meet me just before? Opportunity to make fortuity inevitable! Challenge now!", and the like, may be provided together with the selection result. When the randomly selected method is the method of challenging to the friend, recommendation phrases such as "You are a friend of Mr. XX. Did you know Mr. XX? Nicely greet Mr. XX and make a friend with him" or "Mr. XX and I are already friends. Can I be clearly a good friend of Mr. XX?", and the like, may be provided together with the selection result.

When the user does not select a specific game in advance as shown, the user may get a recommendation of a game to challenge and select the game to challenge.

Figure 8:
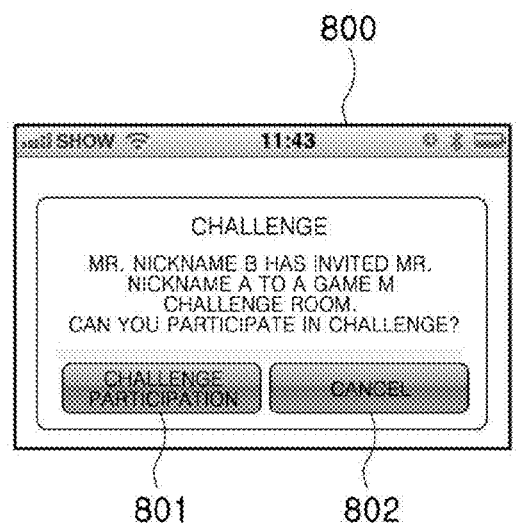
FIG. 8 illustrates a "challenge message transmission to challenge opponent" screen according to exemplary embodiments.

FIG. 8 is a diagram showing a "challenge message transmission to challenge opponent" screen according to exemplary embodiments of the present invention. When the user selects the challenge opponent searched and applies for the challenge opponent, a challenge message 800 may be transmitted to the user terminal of the challenge opponent. The transmitted challenge message may include challenge related information, and the challenge opponent may click a "challenge participation" button 801 or a "cancel" button 802 to participate in the challenge or reject the challenge.

FIG. 9 illustrates a "challenge invitation screen" according to the exemplary embodiments. When the user applies for the challenge to the challenge opponents and the challenge opponents accept the challenge a challenge starts, and a challenge invitation 900 is transferred to the user terminal of the challenge participant accepting the challenge, and information such as a game to challenge, a record to challenge, the number of challenge opponents, a challenge time, an inviting person, and the like, are displayed.

Figure 10:
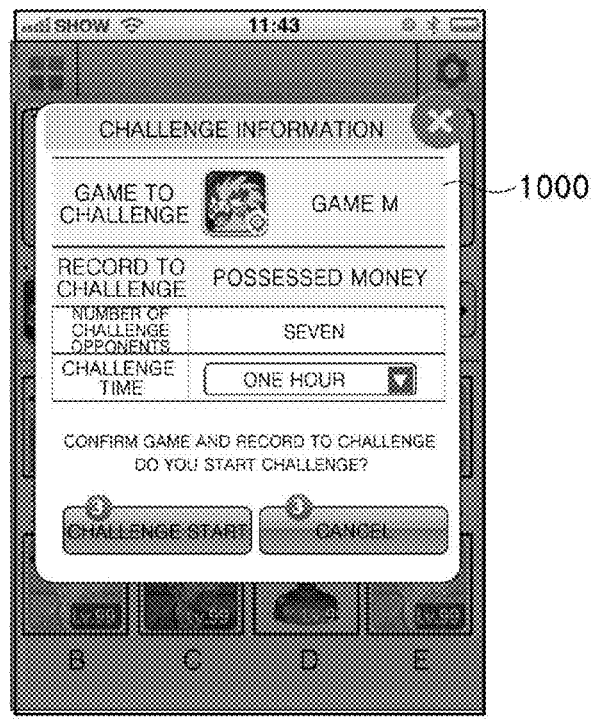
FIG. 10 illustrates a "challenge information" screen according to exemplary embodiments.

FIG. 10 illustrates a "challenge information" screen according to exemplary embodiments of the present invention. A challenger applicant may confirm challenge information 1000 just before progressing with the challenge and change challenge related information such as a challenge time, and the like.

Figure 11:
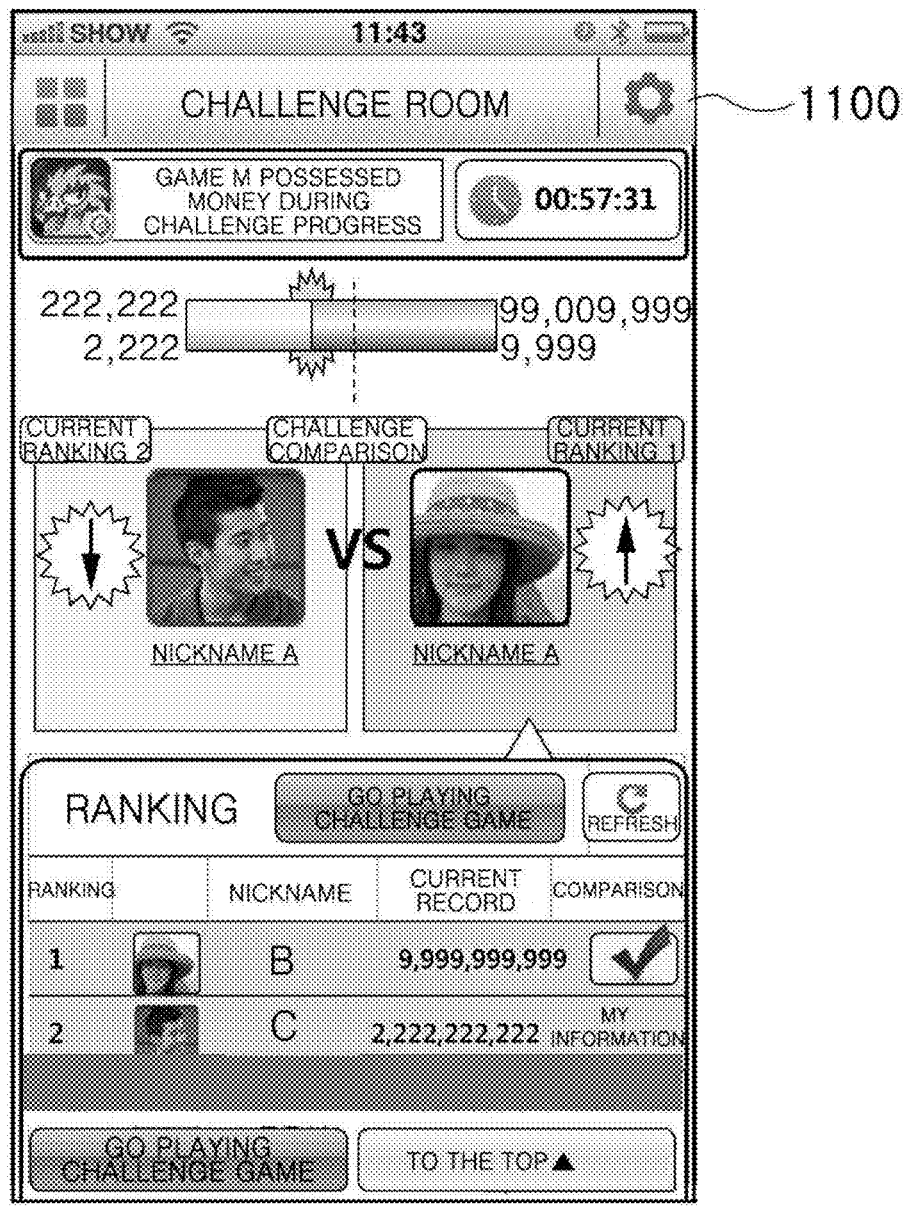
FIG. 11 illustrates a "challenge room inquiry" screen according to exemplary embodiments.

FIG. 11 illustrates a "challenge room inquiry" screen according to exemplary embodiments of the present invention. The challenge requester may access a "challenge room 1100" menu during the challenge progress to confirm a current challenge progress situation in real time. For example, records of current ranking 1 and ranking 2 may be compared with each other, rankings and current records of the respective challengers may be displayed. A challenge game image, title, a remaining challenge time, and the like, may be displayed.

Figure 12:
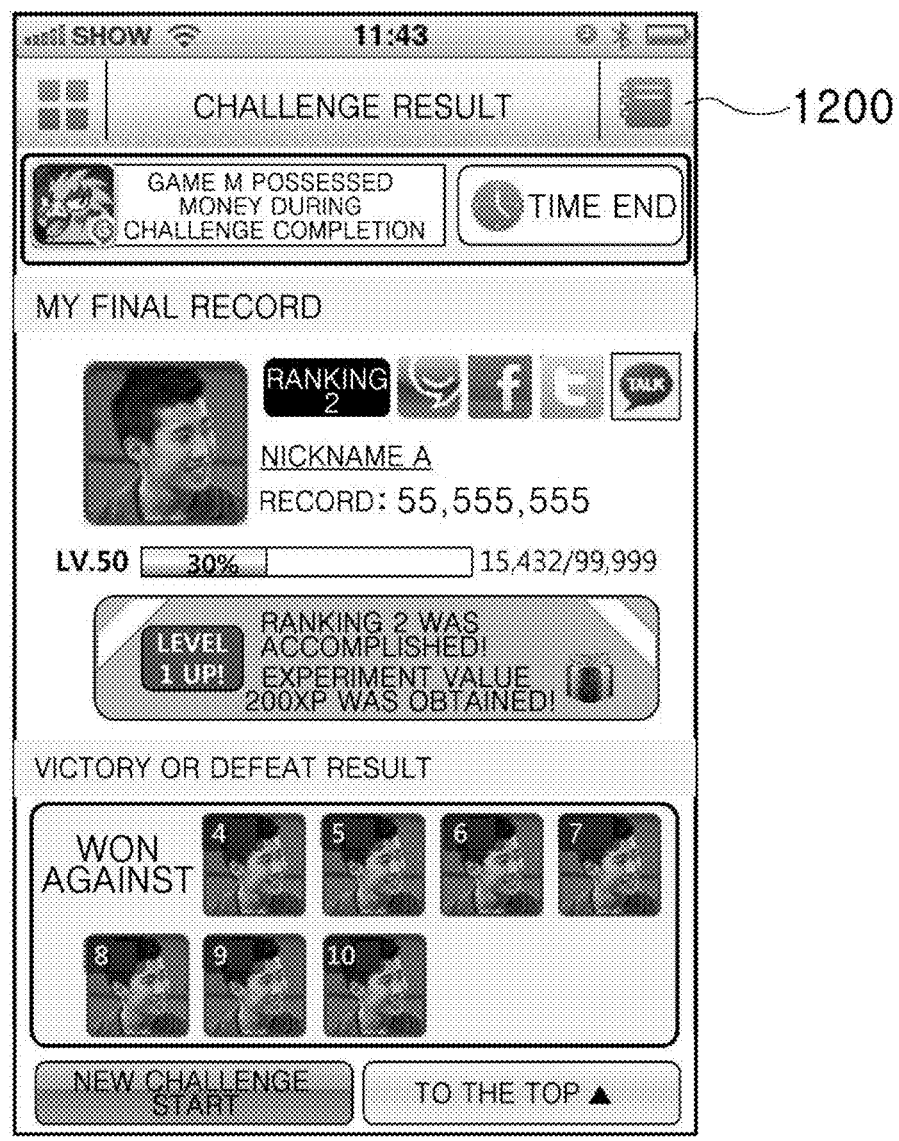
FIG. 12 illustrates a "challenge result" screen according to exemplary embodiments.

FIG. 12 illustrates a "challenge result" screen according to exemplary embodiments of the present invention. After a set challenge time elapses, when the challenge ends, a challenge result screen 1200 may be displayed. A final record, an accomplished object, an obtained point, a victory or defeat result (for example, persons defeated by me, persons drawn with me, persons beating me, and the like) may also be displayed on the challenge result screen 1200.

Search Algorithm for Challenging to Neighboring Person

Hereinafter, a method for searching neighboring persons for a game challenge according to exemplary embodiments of the present invention will be described with reference to FIGS. 13 to 20.

Figure 13:
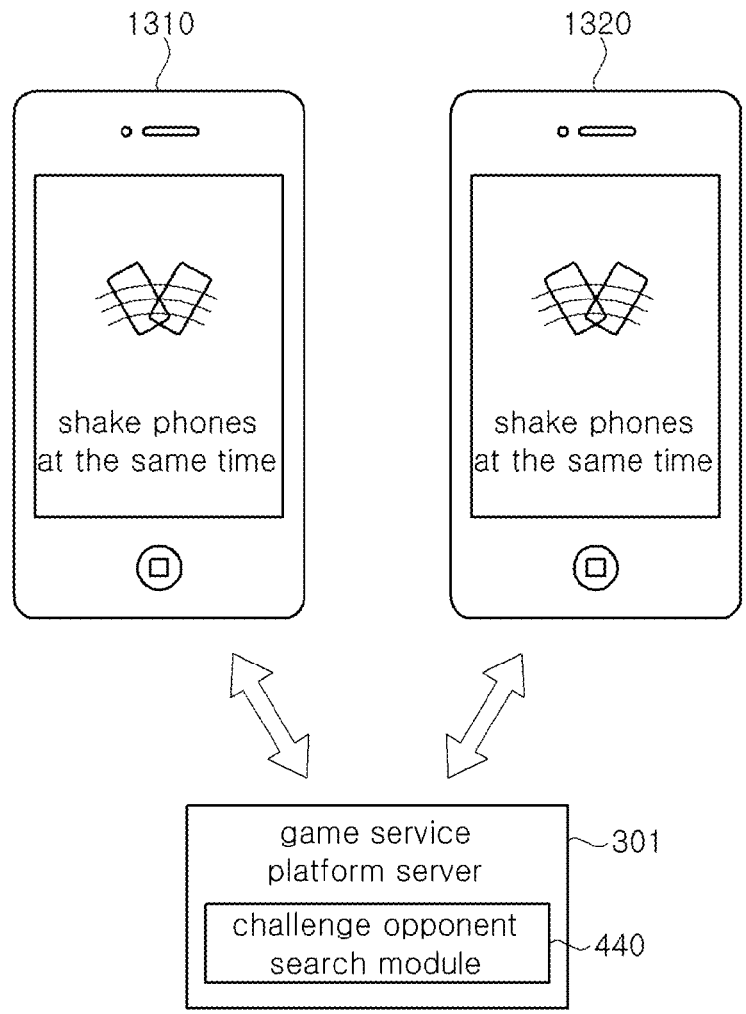
FIG. 13 illustrates a concept of searching game challenge opponents based on an action of a user according to exemplary embodiments.

FIG. 13 illustrates a concept of searching game challenge opponents based on an action of a user according to exemplary embodiments of the present invention. When the user shakes the user terminal 1310 in the "challenge to neighboring person" state illustrated in FIG. 7B, challenge opponent search request information is transmitted to the game service platform server 301, and the challenge opponent search module 440 conducts a search to locate another user terminal 1320 shaken at the same time in the vicinity according to the search request and recommends a user of another user terminal 1320 as a challenge opponent.

When a first user of a first user terminal 1310 and a second user of a second user terminal 1320 make a game challenge to each other, the first and second users may perform an action such as shaking the first and second user terminals 1310 and 1320 or bumping the first and second user terminals 1310 and 1320 against each other.

In this case, the first and second user terminals 1310 and 1320 may sense the action (the motion) thereof by a sensor (for example, a gravity sensor, a terrestrial magnetism sensor, an acceleration sensor, or a gyro sensor) and provide the challenge opponent search request generated according to the motion to the game service platform server 301.

The game service platform server 301 may obtain position information of the first user terminal 1310 according to the request received from the first user terminal 1310 and distance information set by the first user. The game service platform server 301 may obtain position information of the second user terminal 1320 according to the request received from the second user terminal 1320 and distance information set by the second user.

The game service platform server 301 may obtain the position information of the user terminal transmitting the search request and the distance information set by the user of the corresponding user terminal. The position information may be received together with the request in the game service platform server 301 through the corresponding user terminal or in the game service platform server 301 through a separate position information providing system having position information of the corresponding user terminal. The distance information may be set by the user of the corresponding user terminal, such that it is stored in the corresponding user terminal and then received together with the request in the game service platform server 301 through the user terminal or may be received in the game service platform server 301 when it is set by the user, such that it may be stored in the game service platform server 301 in advance.

The game service platform server 301 obtaining the position information and the distance information of each of the first and second user terminals 1310 and 1320 may determine a range for searching the challenge opponents for each terminal based on the position information and the distance information. The position information means a current coordinate of the user terminal, and the distance information means in which a distance of the users of other user terminals to be searched as the challenge opponents are present based on the current coordinate of the user terminal. The range can be variable set to, for example, 5 meters (m), 10 m, 20 m, 50 m, 100 m, 200 m, or the like.

When the distance information is set to 50 m, the game service platform server 301 may search other user terminals present in a radius of 50 m from a current position of the corresponding user terminal. In this case, the user terminals that become search subjects may be user terminals providing the request for searching the challenge opponents through the above-mention motion. When the distance information set by the first user is 50 m and a distance between the first and second user terminals 1310 and 1320 is 5 m, the second user terminal 1320 may be included in other user terminals searched by the game service platform server 301 according to the request of the first user terminal 1310. When, for example, the distance information set by the second user is 15 m and the distance between the first and second user terminals 1310 and 1320 is 30 m, the first user terminal 1310 is not included in other user terminals searched by the game service platform server 301 according to the request of the second user terminal 1320.

The game service platform server 301 may confirm searched other user terminals and provide information on users of the confirmed other user terminals to the user terminals transmitting the request. In the above-mentioned example, the game service platform server 301 may provide information on the user including game related information of the second user terminal 1320 to the first user terminal 1310 according to the request of the first user terminal 1310. The game service platform server 301 may provide information on the user of the first user terminal 1310 to the second user terminal 1320 according to the request of the second user terminal 1320.

When the distance between the first and second user terminals 1310 and 1320 is 20 m, the game service platform server 301 may confirm the second user terminal 1320 according to the request of the first user terminal 1310 and provide information on the user of the confirmed second user terminal 1320 to the first user terminal 1310. However, since the distance information on the second user terminal 1320 is 15 m, the first user terminal 1310 is not searched with respect to the request of the second user terminal 1320.

Figure 14:
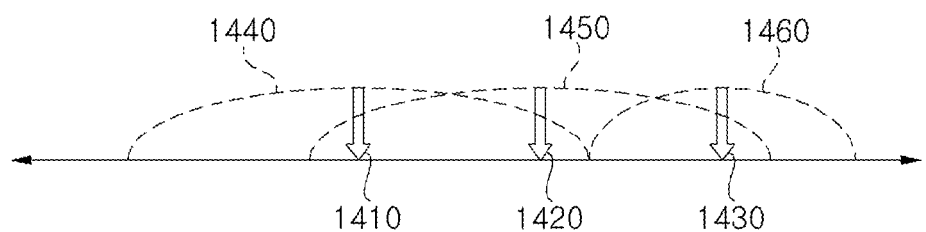
FIG. 14 illustrates a method for searching neighboring game battle opponents according to position information and distance information according to exemplary embodiments.

FIG. 14 illustrates a method for searching neighboring game battle opponents according to position information and distance information according to exemplary embodiments of the present invention. A first arrow 1410, a second arrow 1420, and a third arrow 1430 simply indicate uni-dimensionally positions according to position information of a user terminal A, a user terminal B, and a user terminal C, respectively. A first dotted parabola 1440, a second dotted parabola 1450, and a third dotted parabola 1460 indicate searchable ranges of other user terminals according to distance information of the user terminal A, the user terminal B, and the user terminal C, respectively.

In FIG. 14, for the user terminal A, only the user terminal B is included in the searchable range as illustrated by first dotted parabola 1440. For the user terminal B, both of the user terminal A and the user terminal B are included in the searchable range per second dotted parabola 1450. For the user terminal C, a user terminal included in the searchable range is not present per third dotted parabola 1460.

Per FIGS. 13 and 14, the game service platform server 301 may provide various information on the user of the user terminal B as the search result to the user terminal B, with respect to the request generated according to the motion of the user terminal A. Likewise, the game service platform server 301 may provide information on the users of the user terminal B and the user terminal C as the search result to the user terminal B, with respect to the request generated according to the motion of the user terminal B. However, the game service platform server 301 may notify the user terminal C that a search result is not present, with respect to the request generated according to the motion of the user terminal C.

When the information on the user of the user terminal B is selected in the user terminal A and the information on the user of the user terminal A is selected in the user terminal B, the game service platform server 301 stores information on the users of the user terminal A and the user terminal B in interconnection with each other, thereby making it possible to set the users of the user terminal A and the user terminal B to the challenge opponents to each other to play the game.

The game service platform server 301 may also perform a uni-directional challenge opponent search. When the information on the user of the user terminal C is selected in the user terminal B, even though a search user terminal is not present in the user terminal C, the game service platform server 301 may transfer a challenge invitation according to the challenge opponent search request of the user terminal B as show in FIG. 9 to the user terminal C, and a challenge relationship between the users of the user terminal B and the user terminal C may be set according to acceptance of the challenge by the user terminal C.

The game service platform server 301 may search other user terminals by further using at least one of a local time of the user terminal when the user terminal transmits the request according to the motion and an arrival time when the request is received in the game service platform server 301. For example, when the first user terminal 1310 transmits the request generated according to the motion thereof at 3:3:15 and the second user terminal 1320 transmits the request generated according to the motion thereof at 3:3:16, a difference in a local time between the first and second user terminals 1310 and 1320 is 1 second. When an arrival time at which the request of the first user terminal 1310 is received in the game service platform server 301 is 3:3:20 and an arrival time at which the request of the second user terminal 1320 is receive in the game service platform server 301 is 3:3:23, a difference in an arrival time between the first and second user terminals 1310 and 1320 is 3 seconds. The game service platform server 301 may search the first or second user terminals 1310 or 1320 as the subject user terminal only when the difference in the local time is a preset difference value or less or the difference in the arrival time is a preset difference value or less. Exemplary preset difference value can range from mere seconds to minutes to hours, or even days.

The local time or the arrival time may be used when the position information of the user terminal is not accurate, such as the interior of a room, and the preset difference value may be set to be adjusted according to an error range of the position information. In terms of the first user terminal 1310, when the preset difference value is 2 seconds and the difference in the local time is used, since the difference in the local time is 1 second, the second user terminal 1320 may be searched according to the request of the first user terminal 1310. However, when the preset difference value is 2 seconds and the difference in the arrival time is used, since the difference in the arrival time is 3 seconds, the second user terminal 1320 is not searched according to the request of the first user terminal 1310. In order to correct accuracy for the position information of the user terminal, the local time or the arrival time may be used. The difference value in the local time and the difference value in the arrival time may be different from each other and be set by the user.

Figure 15:
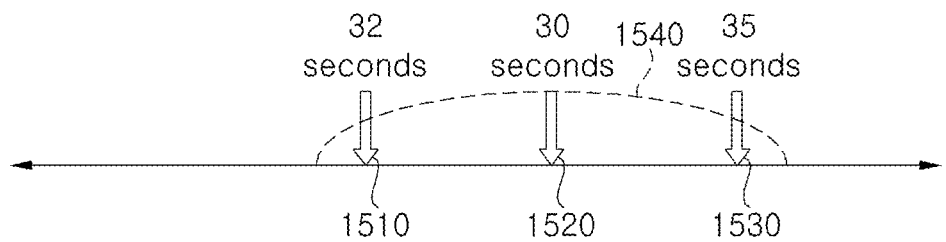
FIG. 15 illustrates a method for searching neighboring game battle opponents according to position information, distance information, and a time according to exemplary embodiments.

FIG. 15 illustrates a method for searching neighboring game battle opponents according to position information, distance information, and a time according to exemplary embodiments of the present invention. A first arrow 1510, a second arrow 1520, and a third arrow 1530 simply indicate uni-dimensionally positions according to position information of a user terminal A, a user terminal B, and a user terminal C, respectively. A dotted parabola 1540 indicates searchable ranges of other user terminals according to distance information of the user terminal B. Time values represented at upper portions of the first arrow 1510, the second arrow 1520, and the third arrow 1530 indicate local times of the user terminal A, the user terminal B, and the user terminal C, respectively. It is assumed that a preset difference value in the time in this example is 3 seconds.

When only the position information and the distance information are used, in terms of the user terminal B, both of the user terminal A and the user terminal C may be searched according to the request of the user terminal B. However, when it is judged that accuracy of the position information is a preset value or less, information on at least one of the local time and the arrival time may be further used. In this case, since a difference in the local time between the user terminal B and the user terminal C, which is 5 seconds, is larger than the above-mentioned difference value, which is 3 seconds, the user terminal C may be excluded from the search. In order to compensate for the accuracy of the position information, the information on the local time or the arrival time may be used.

Again referring to FIG. 13, the game service platform server 301 according to the exemplary embodiment of the present invention described above has used the distance information set by the user. However, a game service platform server 301 according to another exemplary embodiment of the present invention may also use distance information preset to a default. For example, the game service platform server 301 may also search only other user terminals present in 10 m from the user terminal. Also in this case, searched user terminals may be limited to user terminals transmitting the request according to the motion. In this case, the game service platform server 301 according to another exemplary embodiment of the present invention may further use information on at least one of a local time when the user terminal transmits the challenge opponent search request according to the motion thereof and an arrival time when the request is received in order to ensure accuracy of the position information.

The game service platform server 301 according to various exemplary embodiments of the present invention may search other user terminals during a time according to the above-mentioned difference value after an initial request of the user terminal and provide information on the users of searched other user terminals to the user terminal transmitting the initial request. In this case, the game service platform server 301 may provide the information on the users of the user terminals searched until the time according to the above-mentioned difference value at a time after the time according to the above-mentioned difference value elapses or continuously provide the information on the users to the user terminal every preset update time such as every one second or every two seconds until the time according to the above-mentioned difference value elapses. The update time may be determined and used in order to decrease a waiting time of the user to decrease boredom of the user.

The search result may be provided to the respective user terminals as shown in FIG. 7C. Therefore, the user selects at least one user in the list of the searched neighboring persons as the challenge opponent and progresses the challenge for the corresponding game.

Figure 16:
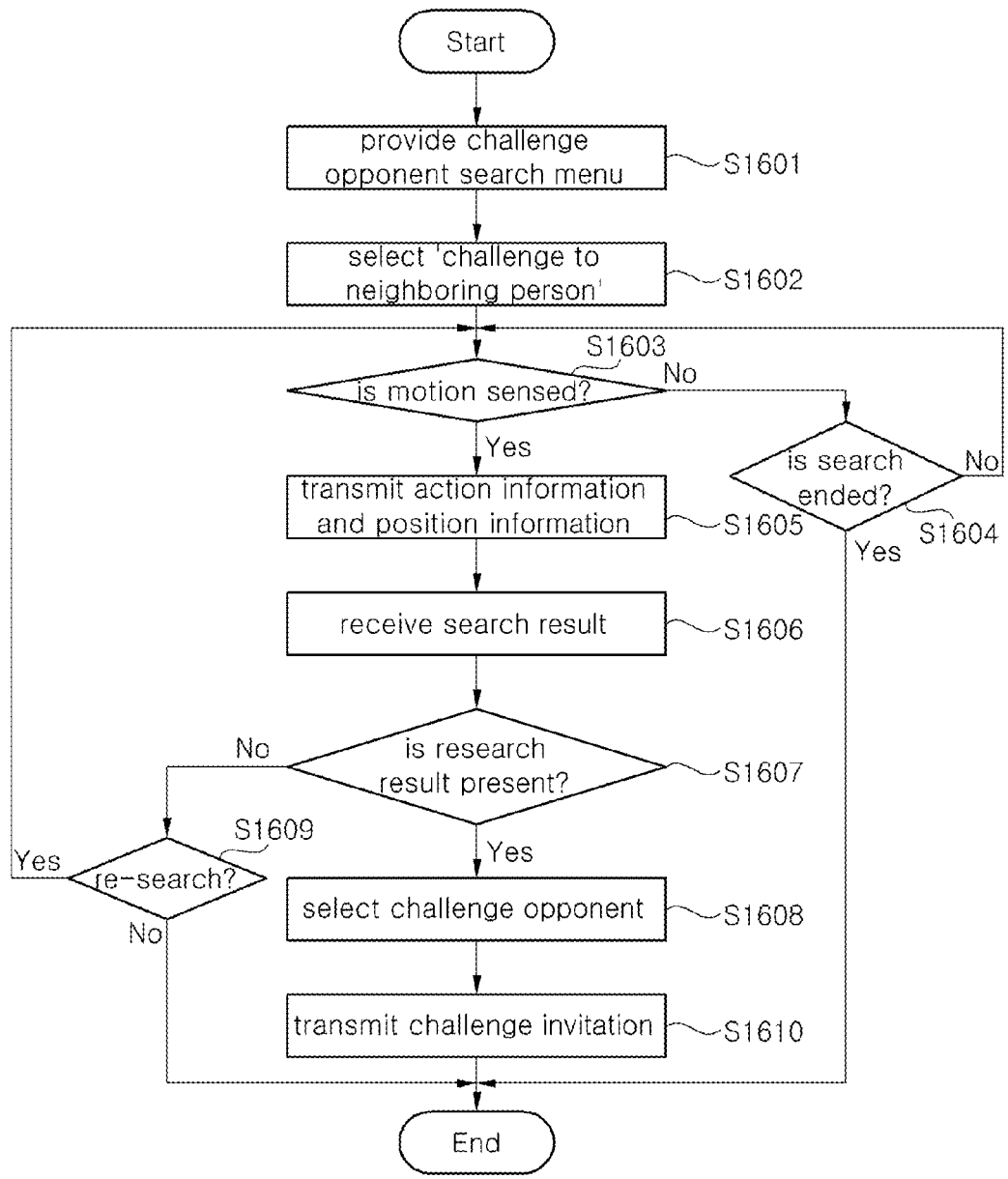

FIG. 16 illustrates a procedure of searching game challenge opponents based on an action of a user according to exemplary embodiments of the present invention. Referring to FIG. 16, when at least one search menu for selecting the challenge opponents is provided to the user terminal (S1601), the user selects the corresponding search menu to search the game challenge opponents. When the "challenge to neighboring person" is selected (S1602), a guide message such as "simultaneously shake phones", or the like, as shown in FIGS. 7B and 13 is displayed. In this case, when the user terminal is shaken or bumped against another user terminal, the user terminal senses the motion (S1603) and performs the challenge opponent search for the neighboring users.

The user terminal transmits the information (for example, motion sensing time information) on the motion (or the action) and the position information (for example, latitude and longitude information) of the user terminal to the server, the game service platform server (S1605). The game service platform serve searches information on adjacent user terminals using the action information and/or the position information collected from the respective user terminals as described above. In this case, the game service platform server may search the user terminals simultaneously moved at adjacent positions or search all user terminals positioned at adjacent positions.

The search result is again transmitted to the user terminals that have been moved, and the user terminals receive the transmitted search result (S1606) to display the search result as a list as shown in FIG. 7C. When the search result is not present according to the received information (S1607), a re-search may also be performed (S1609). When the search result is present according to the received information, at least one user in the list is selected as the challenge opponent (S1608), and the challenge invitation is transmitted to the user terminal of the selected user (S1610), such that the game challenge is proposed.

Figure 17:
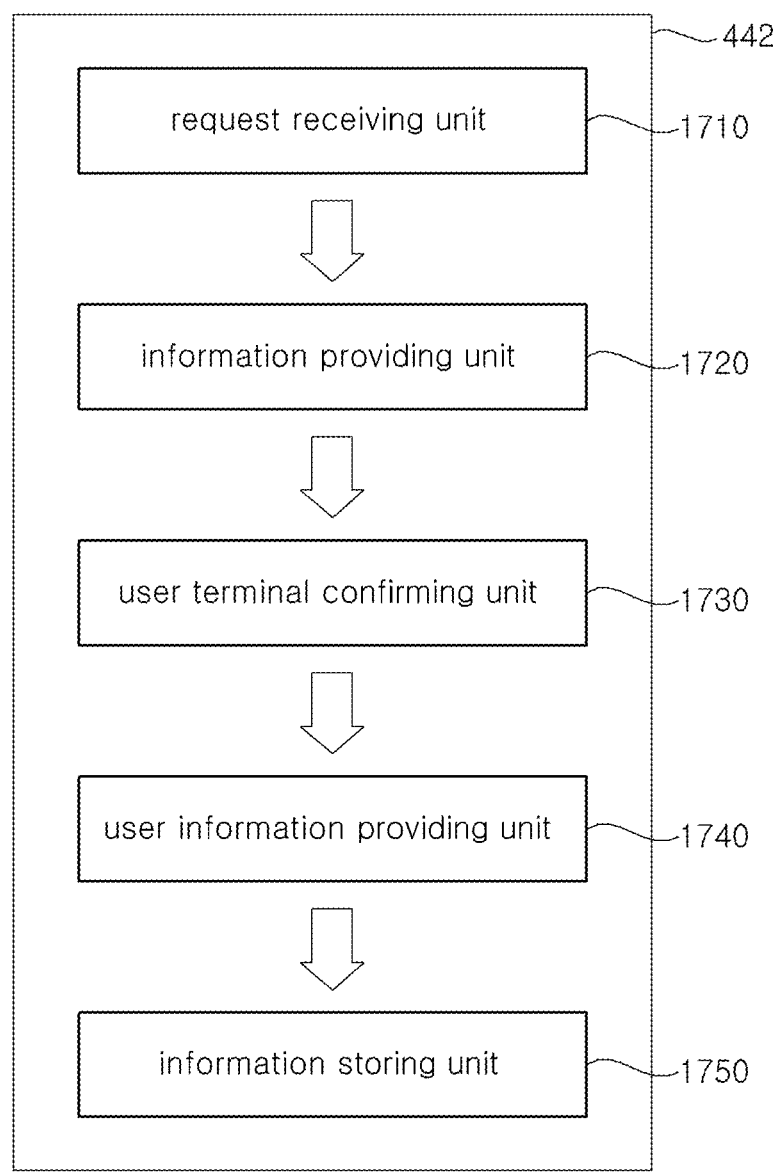
FIG. 17 illustrates a detailed configuration of a neighboring person searching unit according to exemplary embodiments.

FIG. 17 is illustrates a detailed configuration of a neighboring person searching unit according to exemplary embodiments of the present invention. The neighboring person searching unit 442 may correspond to the exemplary embodiment described with reference to FIG. 13. The neighboring person searching unit 442 may search at least one other user terminal using the position information of the user terminal and the distance information set by the user of the corresponding user terminal.

The neighboring person searching unit 442 may include a request receiving unit 1710, an information providing unit 1720, a user terminal confirming unit 1730, and a user information providing unit 1740, and selectively include an information storing unit 1750 as needed, as shown in FIG. 17.

The request receiving unit 1710 receives the request generated according to the motion of the user terminal from the user terminal. The motion of the user terminal may be sensed by the sensor included in the user terminal.

The information providing unit 1720 provides the position information of the user terminal and the distance information set by the user of the user terminal. The information providing unit 1720 may further provide the information on at least one of the local time when the user terminal transmits the request and the arrival time when the request is received.

The user terminal confirming unit 1730 may confirm at least one other user terminal based on the position information and the distance information. For example, the user terminal confirming unit 1730 may confirm other user terminals positioned in a range determined using the position information and the distance information. The user terminal confirm unit 1730 may also confirm other user terminals positioned in the range determined using the position information and the distance information among other user terminals transmitting the request according to the motion. The user terminals that become the search subjects may be other user terminals transmitting the request or be simply other user terminals positioned in the range determined using the position information and the distance information.

When the information providing unit 1720 provides the information on at least one of the local time and the arrival time, the user terminal confirming unit 1730 may confirm at least one other user terminal by further using the information on at least one of them.

For example, the user terminal confirming unit 1730 may confirm other user terminals positioned in the range determined using the position information and the distance information and having the difference in the local time or the difference in the arrival time that is a preset difference value or less, among other user terminals transmitting the request according to the motion.

The user terminal confirming unit 1730 may confirm other user terminals preset update time during a time set by the user of the user terminal. The time for confirming other user terminals may be set by the user as described above or by a preset default value. For example, the preset difference value may correspond to the time for confirming other user terminals.

The user information providing unit 1740 provides the information on the users of other user terminals. The user information providing unit 1740 may further provide the information on the users of other user terminals to other user terminals. In this case, the information storing unit 1750 may connect the information on the user of the user terminal and the information on the users of other user terminals as the challenge opponents with each other and store them in the database, when the information on the users of other user terminals is selected in the user terminal and the information on the user of the user terminal is selected in other user terminals. The information storing unit 1750 is directly included in the neighboring person searching unit 442, but may be included in a separate system interconnected with the neighboring person searching unit 442.

When the user terminal confirming unit 1730 confirms other user terminals every preset update time during the time for confirming other user terminals, the user information providing unit 1740 may provide the information on the users of other user terminals confirmed every preset update time to the user terminal.

Figure 18:
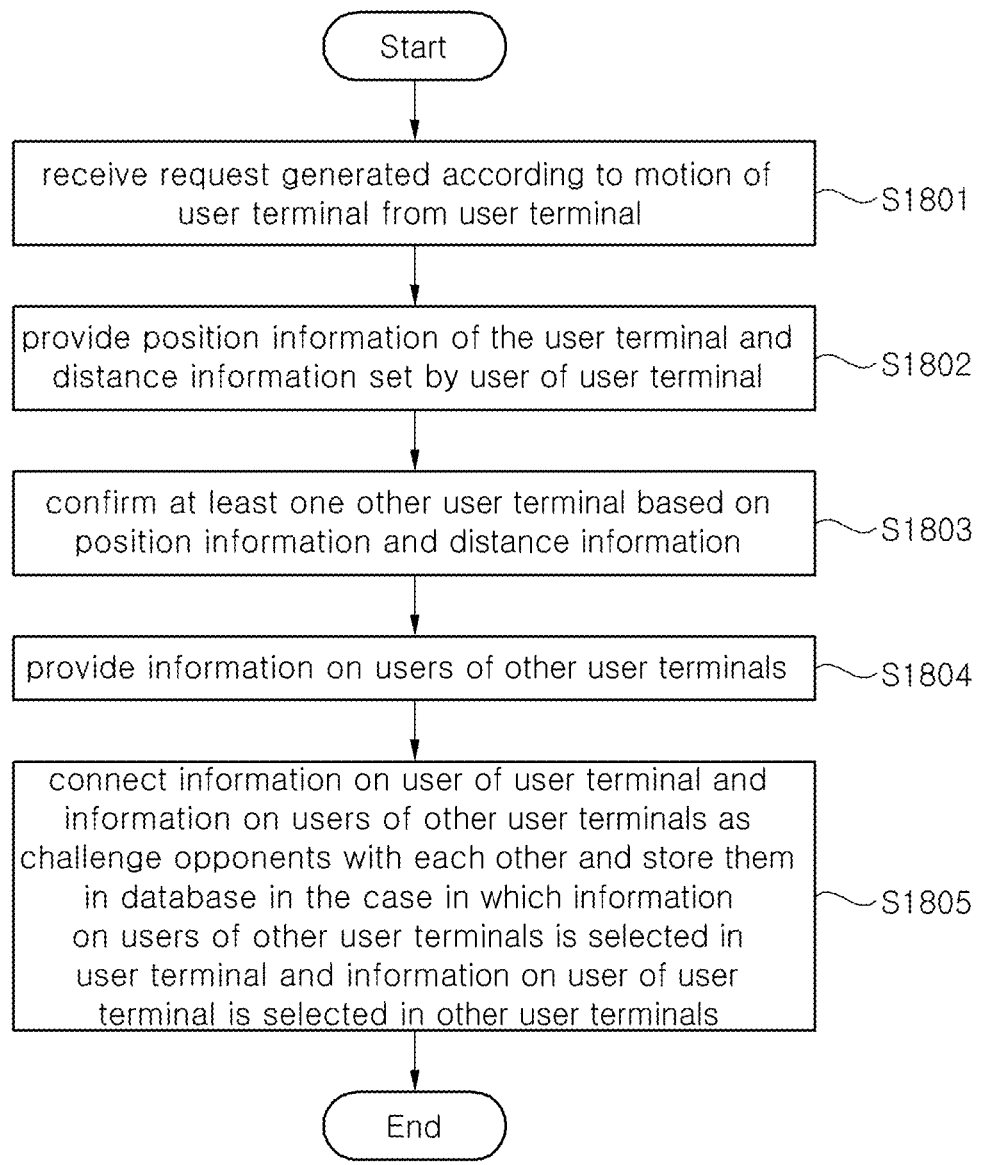
FIG. 18 illustrates a procedure of searching game challenge opponents in the neighboring person searching unit according to exemplary embodiments.

FIG. 18 illustrates a procedure of searching game challenge opponents in the neighboring person searching unit according to exemplary embodiments of the present invention. The procedure of searching game challenge opponents may be performed by the neighboring person searching unit 442 described with reference to FIG. 17. In FIG. 18, the method for searching game challenge opponents will be described by describing a process in which each step is performed by the neighboring person searching unit 442. In FIG. 18, step (S1805) may be selectively performed by the neighboring person searching unit 442 as needed.

In step (S1801), the neighboring person searching unit 442 receives the request generated according to the motion of the user terminal from the user terminal. The motion of the user terminal may be sensed by the sensor included in the user terminal.

In step (S1802), the neighboring person searching unit 442 provides the position information of the user terminal and the distance information set by the user of the user terminal. The neighboring person searching unit 442 may further provide the information on at least one of the local time when the user terminal transmits the request and the arrival time when the request is received.

In step (S1803), the neighboring person searching unit 442 confirms at least one other user terminal based on the position information and the distance information. For example, the neighboring person searching unit 442 may confirm other user terminals positioned in the range determined using the position information and the distance information. The neighboring person searching unit 442 may also confirm other user terminals positioned in the range determined using the position information and the distance information among other user terminals transmitting the request according to the motion. The user terminals that become the search subjects may be other user terminals transmitting the request or be simply other user terminals positioned in the range determined using the position information and the distance information.

When the information on at least one of the local time and the arrival time is further provided in step (S1802), the neighboring person searching unit 442 may confirm at least one other user terminal by further using the information on at least one of them. For example, the neighboring person searching unit 442 may confirm other user terminals positioned in the range determined using the position information and the distance information and having the difference in the local time or the difference in the arrival time that is the preset difference value or less, among other user terminals transmitting the request according to the motion.

The neighboring person searching unit 442 may confirm other user terminals every preset update time during the time set by the user of the user terminal. The time for confirming other user terminals may be set by the user as described above or be the time according to the preset default value. For example, the preset difference value may correspond to the time for confirming other user terminals.

In step (S1804), the neighboring person searching unit 442 provides the information on the users of other user terminals. The neighboring person searching unit 442 may further provide the information on the users of other user terminals to other user terminals. In this case, in step (S1805), the neighboring person searching unit 442 may connect the information on the user of the user terminal and the information on the users of other user terminals as the game challenge opponents with each other and store them in the database, when the information on the users of other user terminals is selected in the user terminal and the information on the user of the user terminal is selected in other user terminals. This step (S1805) is not directly performed in the neighboring person searching unit 442, but may be performed in the separate system interconnected with the neighboring person searching unit 442, as described above.

When other user terminals are confirmed every preset update time during the time for confirming other user terminals in step (S1803), the neighboring person searching unit 442 may provide the information on the users of other user terminals confirmed every preset update time to the user terminal.

See at least FIGS. 13 to 16 with respect to contents omitted in a description of FIGS. 17 and 18.

Figure 19:
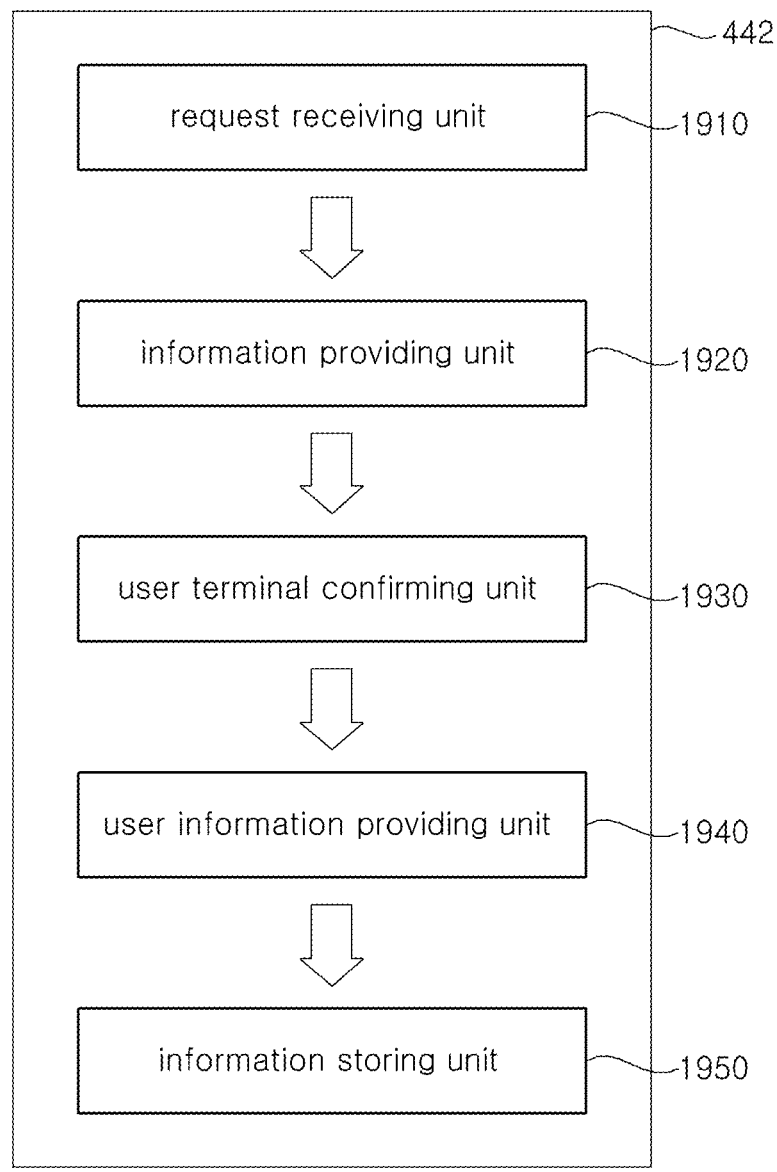
FIG. 19 illustrates a detailed configuration of a neighboring person searching unit according exemplary embodiments.

FIG. 19 illustrates a detailed configuration of a neighboring person searching unit according to exemplary embodiments of the present invention. The neighboring person searching unit 442 may correspond to the exemplary embodiment described with reference to FIG. 13. The neighboring person searching unit 442 may search at least one other user terminal using the information on at least one of the local time when the user terminal transmits the request according to the motion and the arrival time when the request is received and the position information of the user terminal.

The neighboring person searching unit 442 may include a request receiving unit 1910, an information providing unit 1920, a user terminal confirming unit 1930, and a user information providing unit 1940, and selectively further include an information storing unit 1950 as needed.

The request receiving unit 1910 receives the request generated according to the motion of the user terminal from the user terminal. The motion of the user terminal may be sensed by the sensor included in the user terminal.

The information providing unit 1920 may provide the information on at least one of the local time when the user terminal transmits the request and the arrival time when the request is received and the position information of the user terminal.

The user terminal confirming unit 1930 may confirm at least one other user terminal based on the position information and the information on at least one of the local time and the arrival time. For example, the user terminal confirming unit 1930 may confirm other user terminals positioned in the range determined using the position information and the preset distance information and having the difference in the local time or the difference in the arrival time that is the preset difference value or less, among other user terminals transmitting the request according to the motion.

The user terminal confirming unit 1930 may confirm other user terminals positioned in the range determined using the position information and the distance information set by the user of the user terminal and having the difference in the local time or the difference in the arrival time that is a preset difference value or less, among other user terminals transmitting the request according to the motion.

The neighboring person searching unit 442 may confirm other user terminals every preset update time during the time set by the user of the user terminal. The time for confirming other user terminals may be set by the user as described above or be the time according to the preset default value. For example, the preset difference value may correspond to the time for confirming other user terminals.

The user information providing unit 1940 provides the information on the users of other user terminals. The user information providing unit 1940 may further provide the information on the users of other user terminals to other user terminals. The information storing unit 1950 may connect the information on the user of the user terminal and the information on the users of other user terminals as the challenge opponents with each other and store them in the database, when the information on the users of other user terminals is selected in the user terminal and the information on the user of the user terminal is selected in other user terminals. The information storing unit 1950 is directly included in the neighboring person searching unit 442, but may be included in a separate system interconnected with the neighboring person searching unit 442.

When the user terminal confirming unit 1930 confirms other user terminals every preset update time during the time for confirming other user terminals, the user information providing unit 1940 may provide the information on the users of other user terminals confirmed every preset update time to the user terminal.

The neighboring person searching unit 442 may further include a user information maintaining unit (not shown) maintaining the information on other users connected as the challenge opponents to each user in the database. The user information maintaining unit is directly included in the neighboring person searching unit 442, but may be included in the separate system interconnected with the neighboring person searching unit 442.

Figure 20:
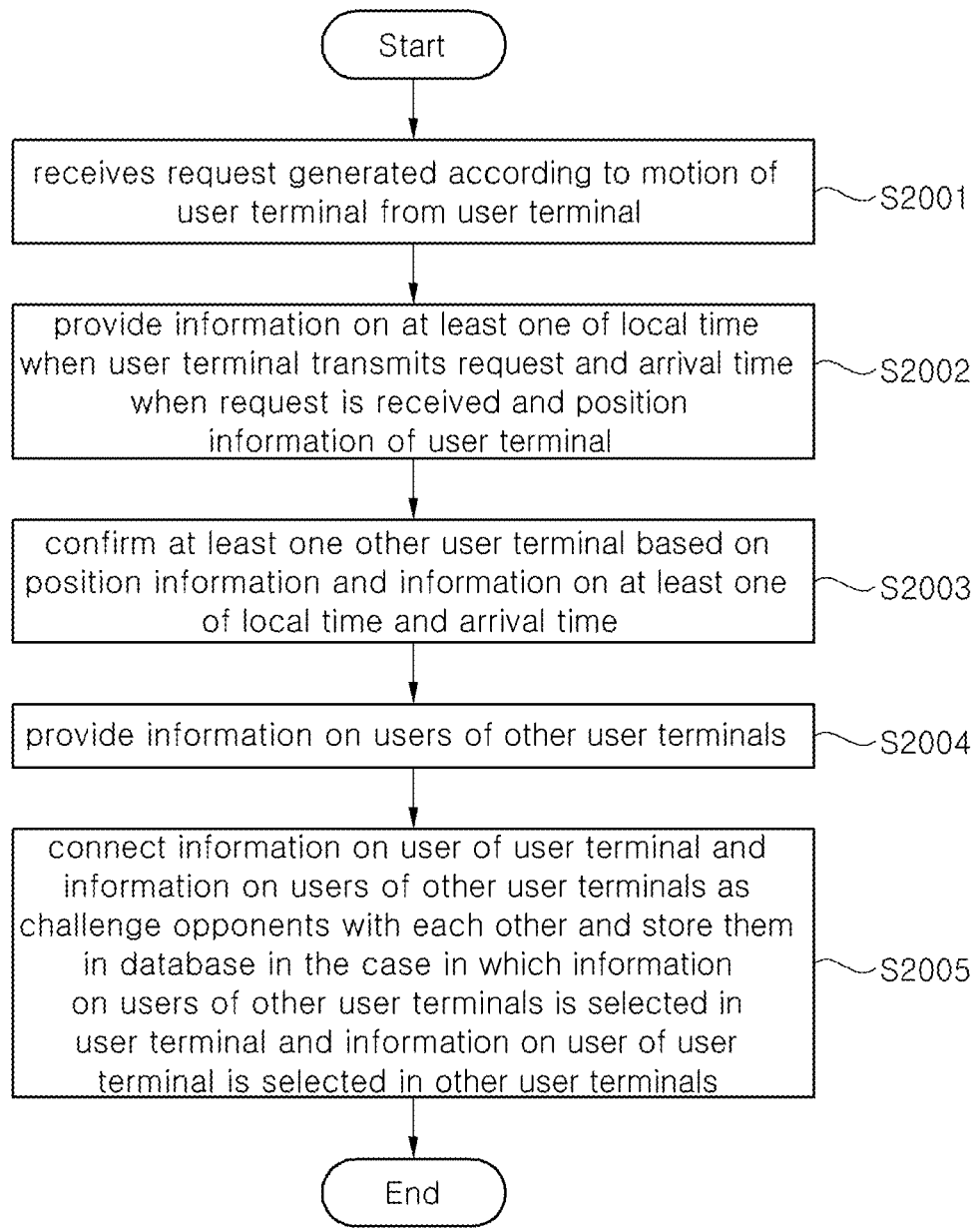
FIG. 20 illustrates a procedure of searching game challenge opponents in the neighboring person searching unit according to exemplary embodiments.

FIG. 20 illustrates a procedure of searching game challenge opponents in the neighboring person searching unit according to exemplary embodiments of the present invention. The procedure of searching game challenge opponents may be performed by the neighboring person searching unit 442 described with reference to FIG. 19. In FIG. 20, the method for searching game challenge opponents includes a process in which each step is performed by the neighboring person searching unit 442. In FIG. 20, step (S2005) may be selectively performed by the neighboring person searching unit 442 as needed.

In step (S2001), the neighboring person searching unit 442 receives the request generated according to the motion of the user terminal from the user terminal. The motion of the user terminal may be sensed by the sensor included in the user terminal.

In step (S2002), the neighboring person searching unit 442 may provide the information on at least one of the local time when the user terminal transmits the request and the arrival time when the request is received and the position information of the user terminal.

In step (S2003), the neighboring person searching unit 442 confirms at least one other user terminal based on the position information and the information on at least one of the local time and the arrival time. For example, the neighboring person searching unit 442 may confirm other user terminals positioned in the range determined using the position information and the preset distance information and having the difference in the local time or the difference in the arrival time that is the preset difference value or less, among other user terminals transmitting the request according to the motion. As another example, the neighboring person searching unit 442 may also confirm other user terminals positioned in the range determined using the position information and the distance information set by the user of the user terminal and having the difference in the local time or the difference in the arrival time that is a preset difference value or less, among other user terminals transmitting the request according to the motion.

In step (S2004), the neighboring person searching unit 442 provides the information on the users of other user terminals. The neighboring person searching unit 442 may further provide the information on the users of other user terminals to other user terminals. In this case, in step (S2005), the neighboring person searching unit 442 may connect the information on the user of the user terminal and the information on the users of other user terminals as the challenge opponents with each other and store them in the database, when the information on the users of other user terminals is selected in the user terminal and the information on the user of the user terminal is selected in other user terminals. This step (S2005) is not directly performed by the neighboring person searching unit 442, but may be performed by the separate system interconnected with the neighboring person searching unit 442, as described above.

When other user terminals are confirmed every preset update time during the time set by the user in step (S2003), the neighboring person searching unit 442 may provide the information on the users of other user terminals confirmed every preset update time to the user terminal.

The neighboring person searching unit 442 may further perform a step (not shown) of maintaining the information on other users connected as the challenge opponents to each user in the database. This step of maintaining the information in the database is not directly performed by the neighboring person searching unit 442, but may be performed by the separate system interconnected with the neighboring person searching unit 442, as described above.

See at least FIGS. 13 to 16 with respect to contents omitted in FIGS. 19 and 20.

As described above, according to exemplary embodiments of the present invention, the users may select themselves as the challenge opponents to each other only with the action of generating the motion of the user terminals, such as the action of shaking the respective user terminals, the action of bumping them against each other, or the like.

The information on the users of other user terminals may be provided to the user using the position information of the user terminal and the distance information set by the user and be provided to the user using the local time when the request generated through the motion of the user terminal of the user is transmitted and the arrival time when the request is received, according to the request generated through the motion of the user terminal.

When the position information of the user terminal is not accurate, the subject user terminals to be selected as the challenge opponents may be more accurately confirmed using the local time of the user terminal when the request is transmitted and the arrival time when the request is received, and other user terminals to be selected as the challenge opponents are confirmed every preset update time during the time set by the user and the information on the users of other user terminals is provided, thereby making it possible to decrease a waiting time of the user.

The exemplary embodiments according to the present invention are implemented in a form of program commands capable of being performed through various computer components to thereby be recordable in a computer-readable recording medium. The computer readable medium may include program instructions, data files, data structure, or the like, alone or a combination thereof. The program command recorded in the computer-readable recording medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM, a DVD; a magneto-optical medium such as an optical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments and the following claims as well as all modified equally or equivalently to the claims are intended to fall within the scope and spirit of the invention.

What is claimed is:

1. A method that is executed by a game service platform server managing a plurality of games for searching game challenge opponents, the method comprising:
    receiving, on the game service platform server, a game challenge opponent request generated from a first terminal based on a motion detected from at least one of a gravity sensor, a terrestrial magnetism sensor, an acceleration sensor, and a gyro sensor of the first terminal;
    receiving, from the first terminal, a position of the first terminal, a desired distance of an opponent with respect to the position of the first terminal set by the first terminal, and a local time of generating the game challenge opponent request;
    searching for a second terminal based on the position, the desired distance, and the local time of the first terminal; and
    setting the searched second terminal to be a game challenge opponent candidate if the position of the first terminal is within the desired distance set by the second terminal and if a difference between the local time of the first terminal and a local time of generating a game challenge opponent request by the second terminal is within a first time range set by the first terminal, and providing user information of the searched second terminal to the first terminal,
    wherein the first and the second terminals are configured to execute a game service platform for managing the plurality of games and providing the game challenge opponent candidate.

2. The method of claim 1, further comprising:
    receiving selection information for the second terminal from the first terminal and transmitting challenge application information to the selected second terminal; and
    setting the second terminal as a challenge opponent when a challenge acceptance is received from the second terminal.

3. The method of claim 2, further comprising transmitting game progress situations between the first terminal and the second terminal in real time when a challenge starts.

4. The method of claim 3, further comprising transmitting a challenge result to the first and second terminals when the challenge ends.

5. The method of claim 3, wherein the game progress situations and the challenge result are shared with a Social Network Service (SNS) server interconnected with the game service platform.

6. The method of claim 4, further comprising receiving information on a challenge period during which the challenge can be performed for multiple times with the challenge opponent from the first terminal and determining a challenge end point in time based on the information on the challenge period.

7. The method of claim 3, further comprising receiving information on a number of challengers from the first terminal and limiting challenge applicants based on the information on the number of challengers.

8. The method of claim 1, wherein the searching comprises determining that the second terminal is positioned in a range using the position and the desired distance.

9. The method of claim 1, wherein searching of the second terminal further comprises repeatedly searching for the second terminal every preset update interval set by the first terminal for an update time duration set by the first terminal.

10. A system comprising a game service platform server managing a plurality of games for searching game challenge opponents, the game service platform server comprising:
    a request receiving unit on the game service platform server configured to receive a game challenge opponent request generated from a first terminal based on a motion detected from at least one of a gravity sensor, a terrestrial magnetism sensor, an acceleration sensor, and a gyro sensor of the first terminal;
    an information providing unit configured to receive, from the first terminal, a position of the first terminal, a desired distance of an opponent with respect to the position of the first terminal set by the first terminal, and a local time of generating the game challenge opponent request;
    a terminal confirming unit configured to search for a second terminal based on the position, the desired distance, and the local time of the first terminal; and
    a user information providing unit configured to set the searched second terminal to a game challenge opponent candidate if the position of the first terminal is within the desired distance set by the second terminal and if a difference between the local time of the first terminal and a local time of generating a game challenge opponent request by the second terminal is within a first time range set by the first terminal, and providing user information for the searched second terminal to the first terminal,
    wherein the first and the second terminals are configured to execute a game service platform for managing the plurality of games and providing the game challenge opponent candidate.

11. The system of claim 10, wherein the game service platform server further comprises:
    a challenge proposal processing unit configured to receive selection information for the second terminal from the first terminal and transmitting challenge application information to the selected second terminal; and
    a challenge acceptance processing unit configured to set the second terminal to a challenge opponent when challenge acceptance is received from the second terminal.

12. The system of claim 11, wherein the game service platform server further comprises a challenger notification processing unit configured to transmit game progress situations between the first terminal and the second terminal in real time when a challenge starts.

13. The system of claim 12, wherein the challenger notification processing unit transmits challenge results to the first and second terminals when the challenge ends.

14. The system of claim 13, wherein the game service platform server further comprises a challenge managing unit configured to receive information on a challenge period from the first terminal before the challenge starts and determining a challenge end point in time based on the information on the challenge period.

15. The system of claim 10, wherein the terminal confirming unit searches the second terminal positioned in a range determined using the position and the desired distance.

16. A non-transitory computer-readable storage medium having stored thereon processor-executable instructions configured to cause a processor of a game service platform server to perform operations for managing a plurality of games and game challenge opponent candidates, the operations comprising:

- receiving a game challenge opponent request generated from a first terminal based on a motion detected from at least one of a gravity sensor, a terrestrial magnetism sensor, an acceleration sensor, and a gyro sensor of the first terminal;
- receiving, from the first terminal, a position of the first terminal, a desired distance of an opponent with respect to the position of the first terminal set by the first terminal, and a local time of generating the game challenge opponent request;
- searching for a second terminal based on the position of the first terminal, the desired distance, and the local time of the first terminal; and
- setting information of the searched second terminal to a game challenge opponent candidate if the position of the first terminal is within the desired distance set by the second terminal and if a difference between the local time of the first terminal and a local time of generating a game challenge opponent request by the second terminal is within a first time range set by the first terminal, and providing information or the searched second terminal to the first terminal,
- wherein the first and the second terminals are configured to execute a game service platform for managing the plurality of games and providing the game challenge opponent candidate.

17. A method that is executed by a processor on a game server, the method comprising:

- receiving a game challenge initiated by a motion detected from at least one of a gravity sensor, a terrestrial magnetism sensor, an acceleration sensor, and a gyro sensor of a first terminal;
- receiving a position of the first terminal, a desired distance set by the first terminal, and a local time of generating the game challenge opponent request;
- searching, using the processor, to generate a list of challenge candidate terminals that are within the desired distance of the position;
- providing user information associated with each of the challenge candidate terminals to the first terminal if the position of the first terminal is within the desired distance set by the challenge candidate terminals and if a difference between the local time of the terminal a local time of generating a game challenge opponent request by each of the challenge candidate terminals is within a first time range set by the first terminal; and
- setting at least one of the challenge candidate terminals as an opponent of the first terminal.

18. The method of claim 6, wherein a plurality of the challenges are performed with the challenge opponent during the challenge period set by the first terminal.

* * * * *